(12) United States Patent
Matsuura et al.

(10) Patent No.: US 7,347,889 B2
(45) Date of Patent: Mar. 25, 2008

(54) ULTRASONIC SOLUTION SEPARATOR

(75) Inventors: Kazuo Matsuura, Naruto (JP); Masanori Sato, Naruto (JP)

(73) Assignee: Ultrasound Brewery, Tokushima (JP)

( * ) Notice: Subject to any disclaimer, the term of this patent is extended or adjusted under 35 U.S.C. 154(b) by 346 days.

(21) Appl. No.: 10/897,090

(22) Filed: Jul. 23, 2004

(65) Prior Publication Data
US 2005/0016380 A1    Jan. 27, 2005

(30) Foreign Application Priority Data

| Jul. 25, 2003 | (JP) | .............................. 2003-280499 |
| Aug. 26, 2003 | (JP) | .............................. 2003-302161 |
| Aug. 27, 2003 | (JP) | .............................. 2003-303705 |
| Aug. 27, 2003 | (JP) | .............................. 2003-303706 |

(51) Int. Cl.
  *B01D 3/00* (2006.01)
  *B01D 1/00* (2006.01)
  *B01D 51/00* (2006.01)
  *B01D 51/02* (2006.01)
  *C12G 3/12* (2006.01)
  *B05B 17/06* (2006.01)
  *B03C 3/014* (2006.01)
  *B01F 3/04* (2006.01)
  *B01F 11/00* (2006.01)

(52) U.S. Cl. .............................. 96/389; 96/243; 96/270; 96/271; 96/273; 96/322; 96/355; 96/359; 96/360; 96/97; 96/361; 95/73; 95/149; 261/78.2; 261/81; 261/DIG. 48

(58) Field of Classification Search .................. 96/389, 96/243, 270, 271, 273, 322, 355, 359, 360, 96/361, 97, 351; 261/78.2, 81, DIG. 48, 261/82, DIG. 65; 55/254; 95/149, 73
See application file for complete search history.

(56) References Cited

U.S. PATENT DOCUMENTS

| 3,034,726 | A | * | 5/1962 | Peras .......................... 239/132 |
| 3,392,916 | A | * | 7/1968 | Engstrom et al. ......... 239/102.2 |
| 4,591,440 | A | * | 5/1986 | Higashimura et al. ...... 210/640 |
| 4,722,901 | A | * | 2/1988 | Hirose ...................... 435/300.1 |
| 4,940,134 | A |   | 7/1990 | Aoki et al. |
| 5,176,856 | A | * | 1/1993 | Takahashi et al. .......... 261/142 |
| 5,217,165 | A |   | 6/1993 | Takahashi et al. |
| 5,653,852 | A |   | 8/1997 | Meng |
| 5,671,612 | A | * | 9/1997 | Menzenski .................... 62/611 |
| 6,235,088 | B1 | * | 5/2001 | Matsuura ........................ 96/53 |
| 6,402,126 | B2 | * | 6/2002 | Vaartstra et al. ............. 261/141 |

FOREIGN PATENT DOCUMENTS

| DE | 31 47 460 |   | 6/1983 |
| DE | 40 11 956 |   | 10/1990 |
| EP | 0 511 687 |   | 11/1992 |
| EP | 1 145 755 |   | 10/2001 |
| JP | 7-185203 |   | 7/1995 |
| JP | 07-185203 | * | 7/1995 |
| JP | 09-187601 | * | 7/1997 |
| JP | 9-187601 |   | 7/1997 |
| JP | 2001-314724 | * | 11/2001 |

* cited by examiner

*Primary Examiner*—Duane Smith
*Assistant Examiner*—Ives Wu
(74) *Attorney, Agent, or Firm*—Wenderoth, Lind & Ponack, L.L.P.

(57) ABSTRACT

An ultrasonic solution separator including an ultrasonic atomization chamber supplied with a solution containing a target material; an ultrasonic oscillator producing mist from the solution in the ultrasonic atomization chamber with ultrasonic oscillation; a power supply for ultrasonics connected to the ultrasonic oscillator, and a collection portion transporting the mist produced by the ultrasonic oscillator with a carrier gas and aggregating and collecting the mist included in the carrier gas. The power supply supplying high-frequency power to the ultrasonic oscillator so that the ultrasonic oscillator oscillates at an ultrasonic frequency. The ultrasonic separator aggregates and collects the mist produced in the ultrasonic atomization chamber by means of the collection portion. With this ultrasonic solution separator, the temperature of carrier gas in the ultrasonic atomization chamber is at least 5° C. higher than the carrier gas in the collection portion.

37 Claims, 30 Drawing Sheets

ULTRASONIC SOLUTION SEPARATOR

BACKGROUND OF THE INVENTION

1. Technical Field

The present invention relates to an alcohol separator which separates a higher concentration of alcohol from an alcohol solution of sake (Japanese rice wine), other alcoholic beverage raw material, or solution of volatile organic compounds.

2. Description of Related Art

The inventor has developed a separator which separates a target material with the characteristics of surface excess such as an alcohol by producing mist by means of ultrasonic waves (see Patent Document 1).

Patent Document 1: Japanese Patent Laid-Open Publication TOKUKAI No. 2001-314724 With this type of alcohol separator, an alcohol solution is filled into an ultrasonic atomization chamber with a seal structure, and the alcohol solution in the ultrasonic atomization chamber is atomized into mist by means of ultrasonic oscillation of an ultrasonic oscillator. The alcohol separator aggregates and collects the atomized mist, and separates a higher concentration of alcohol solution. More specially, the alcohol separator separates a higher concentration of alcohol solution as a target material as follows.

With an alcohol, which quickly moves to the surface and exhibits the characteristics of surface excess, the concentration of alcohol is high at its surface. When the solution is oscillated by ultrasonic oscillation, fine liquid droplets are ejected from the surface of the solution as mist into carrier gas by ultrasonic energy. The mist ejected into the carrier gas has a high concentration of alcohol. The reason is that the solution at its surface with a high concentration of alcohol is ejected as the mist. Accordingly, a solution with a high concentration of alcohol can be separated by aggregating and collecting the mist. With this method, a high concentrated alcohol solution can be separated without heating a solution. Thus, a high-concentrated target material can be separated with less energy consumption. Furthermore, since heating is not necessary, the separator has an advantage in that the target material can be separated without deterioration.

FIG. 1 is a block diagram showing an apparatus, which oscillates a solution to produce mist and then aggregates and collects the mist in a collection portion. With the ultrasonic separating apparatus of this figure, the mist produced in an ultrasonic atomization chamber 4 is aggregated and collected in a collection portion 5. The mist produced by means of ultrasonic waves is composed of fine liquid droplets ejected from a solution with a high concentration of alcohol. Since the mist as fine liquid droplets is in a liquid state, the mist can be collected by highly aggregating it. Accordingly, the mist can be aggregated by means of the electrostatic attraction forces, or by means of a baffle, which the mist collides with. With the apparatus, which aggregates and collects mist, however, the alcohol included in the mist vapors vaporizes during the process of mist collection, thus, the concentration of alcohol in the mist is gradually reduced. For this reason, the mist produced in the ultrasonic atomization chamber has a high concentration of alcohol immediately after it is produced in the ultrasonic atomization chamber, after that, the concentration of alcohol in the mist is reduced as the mist is transported to the collection portion. Both alcohol and water vaporize from the mist on the path from the ultrasonic atomization chamber to the collection portion. Alcohol tends to easily vaporize compared with water, thus, the concentration of alcohol in the mist is gradually reduced. Accordingly, the apparatus has a disadvantage that the concentration of alcohol in a solution, which is obtained by collecting mist, reduces, though the mist with a high concentration of alcohol is produced by means of ultrasonic waves.

Reduction of the concentration of alcohol in the mist can be held in check by lowering the temperature of carrier gas in the ultrasonic atomization chamber. The reason is that the total amount of alcohol and water in a vapor state, which the carrier gas can hold, varies depending on the temperature. When the temperature is low, the total amount is also low. On the other hand, if the temperature of the carrier gas in the ultrasonic atomization chamber is low, the efficiency of atomization for producing mist from a solution is remarkably reduced. In this case, it is difficult to efficiently produce high-concentrated mist from a solution. This requires high ultrasonic oscillation power for producing the mist. In order to achieve this requirement, it is necessary to increase the performance of the ultrasonic oscillator and a power source for driving the ultrasonic oscillator, thus, both equipment costs and running costs should be high. Such an apparatus is not economical.

Therefore, the present invention has been developed to solve the above disadvantages. It is an important object to provide an ultrasonic separator that is capable of efficiently producing mist from a solution in an ultrasonic atomization chamber, and of collecting a target material included in the mist produced from the solution whereby efficiently separating a high-concentrated solution.

The above and further objects and features of the invention will more fully be apparent from the following detailed description with accompanying drawings.

SUMMARY OF THE INVENTION

An ultrasonic solution separator according to the present invention comprises an ultrasonic atomization chamber supplied with a solution containing a target material; an ultrasonic oscillator producing mist from the solution in the ultrasonic atomization chamber with ultrasonic oscillation; a power supply for ultrasonics connected to the ultrasonic oscillator, the power supply supplying high-frequency power to the ultrasonic oscillator so that the ultrasonic oscillator oscillates at an ultrasonic frequency; and a collection portion transporting the mist produced by the ultrasonic oscillator with a carrier gas and aggregating and collecting the mist included in the carrier gas. The ultrasonic solution separator aggregates and collects the mist produced in the ultrasonic atomization chamber by means of the collection portion. With this ultrasonic solution separator, the temperature of carrier gas in the ultrasonic atomization chamber is at least 5° C. higher than the carrier gas in the collection portion.

The above ultrasonic solution separator has an advantage that can efficiently produce mist from a solution in the ultrasonic atomization chamber, and additionally can collect the target material included in the mist produced from the solution whereby efficiently separating a high-concentrated solution. The reason is that the temperature of carrier gas in the ultrasonic atomization chamber is at least 5° C. higher than the carrier gas in the collection portion. A solution is oscillated at an ultrasonic frequency under this condition whereby producing mist, mist can be efficiently produced from the solution. The efficiency of mist production from a solution varies depending on the temperature of a carrier gas in contact with the surface of the solution. For this reason, when the temperature of a carrier gas is high, the efficiency of mist production is also high. A target material such as an alcohol and a solvent such as water vaporize from mist produced as fine liquid droplets. On the other hand, when the carrier gas is transported from the ultrasonic atomization chamber to the collection portion, the temperature of the carrier gas lowers at least 5°. When the temperature of the carrier gas lowers, the target material, which is included as vapor by the carrier gas, becomes supersaturated and condenses to a liquid. The condensate target material becomes droplets and is collected. Thus, the target material becomes mist in the ultrasonic atomization chamber, and then vaporizes from the mist, and finally becomes supersaturated and is collected in the collection portion. Therefore, the above ultrasonic solution separator has an advantage that efficiently produces mist from a solution, and, in addition, can efficiently also collect a target material whereby efficiently separating a high-concentrated solution.

In an ultrasonic solution separator according to another aspect of the present invention, the ultrasonic solution separator further comprises a vapor heater heating the carrier gas circulated into the ultrasonic atomization chamber, wherein the carrier gas is heated by the vapor heater and is circulated into the ultrasonic atomization chamber.

In an ultrasonic solution separator according to another aspect of the present invention, the ultrasonic solution separator further comprises a solution heater heating the solution in the ultrasonic atomization chamber, wherein an ultrasonic atomization device produces mist from the solution in the state that the solution heater heats the solution.

In an ultrasonic solution separator according to another aspect of the present invention, the collection portion includes a scrubber or a spray tower. The scrubber or the spray tower includes a storage portion storing the collected solution and contacts the collected solution with the mist in the carrier gas and collects the mist in the carrier gas. In other case, in the ultrasonic solution separator, the mist in the carrier gas may be collected by any one of, or a combination of two or more of cyclone, punched plate provided with numbers of small holes, wire mesh demister, chevron, filter, capillary and honeycomb after contacting the collected solution with the mist in the carrier gas.

In an ultrasonic solution separator according to another aspect of the present invention, the ultrasonic solution separator further comprises a blower mechanism circulating the carrier gas between the ultrasonic atomization chamber and the collection portion. The blower mechanism includes a rotary fan for transporting the carrier gas and a motor for rotating the rotary fan through a rotary shaft of the rotary fan connected to the motor. The motor and the rotary fan are connected by a bearing of the rotary shaft, which is sealed by a plastic seal member, a magnetic coupling or an electromagnetic coupling.

In an ultrasonic solution separator according to another aspect of the present invention, the ultrasonic solution separator further comprises a blower mechanism circulating the carrier gas between the ultrasonic atomization chamber and the collection portion, wherein the height of an interior space portion from the surface of the solution is not higher than 50 cm, and the blower mechanism transports the carrier gas in the interior space portion of the ultrasonic atomization chamber at the velocity not less than 0.01 m/s.

In an ultrasonic solution separator according to another aspect of the present invention, the ultrasonic solution separator further comprises a blower mechanism circulating the carrier gas between the ultrasonic atomization chamber and the collection portion, wherein the blower mechanism transports the carrier gas so as to keep the ratio FN (1/min.) of the volume V (litter) of the interior space portion to the flow rate of the carrier gas F (litter/min.) of the ultrasonic atomization chamber not less than 1.

In an ultrasonic solution separator according to another aspect of the present invention, a plurality of ultrasonic atomization chambers are stacked and are connected in parallel or in series.

In an ultrasonic solution separator according to another aspect of the present invention, the collection portion includes a conductive metal plate, a cooler cooling the metal plate, a counter electrode opposed to the metal plate, and a high voltage power supply, which has one terminal connected to the metal plate and another terminal connected the counter electrode and generates an electric filed between the metal plate and the counter electrode.

In an ultrasonic solution separator according to another aspect of the present invention, the collection portion includes a main collection portion and a primary collection portion connected upstream to the main collection portion. The primary collection portion includes any one of, or two or more of cyclone, punched plate provided with numbers of small holes, wire mesh demister, chevron, filter, capillary, honeycomb or a device for collecting the mist by means of electrostatic attraction forces. Additionally, in an ultrasonic solution separator according to another aspect of the present invention, the ultrasonic solution separator further comprises a blower mechanism circulating the carrier gas between the ultrasonic atomization chamber and the collection portion, wherein the blower mechanism is provided between the main collection portion and the primary collection portion, or between the ultrasonic atomization chamber and the primary collection portion.

In an ultrasonic solution separator according to another aspect of the present invention, the carrier gas is an inert gas or a low water soluble gas.

In an ultrasonic solution separator according to another aspect of the present invention, the ultrasonic solution separator further comprises a cooling heat exchanger for cooling the carrier gas transported to the collection portion and a vapor heater for heating the carrier gas transported to the ultrasonic atomization chamber. The cooling heat exchanger is connected to the outlet side of the ultrasonic atomization chamber. The vapor heater is connected to the outlet side of the collection portion. The vapor heater includes a heat exchanger, and a circulation path of a refrigerant connects the heat exchanger of the vapor heater to the cooling heat exchanger. Additionally, in an ultrasonic solution separator according to another aspect of the present invention, the circulation path of the refrigerant connects a compressor to an expansion valve in series, and the heat exchanger of the vapor heater liquefies the gas refrigerant, which is compressed by the compressor whereby heating the vapor heater, while the cooling heat exchanger vaporizes the liquefied refrigerant whereby cooling itself. In addition, in an ultrasonic solution separator according to another aspect of the present invention, a plurality of cooling heat exchangers are connected in series, and a plurality of vapor heaters are connected in series so that the refrigerant is circulated around the plurality of cooling heat exchangers and the plurality of vapor heaters.

In an ultrasonic solution separator according to another aspect of the present invention, the internal, pressure of the ultrasonic atomization chamber is higher than the atmospheric pressure, while the internal pressure of the collection portion is lower than the atmospheric pressure. Additionally, in an ultrasonic solution separator according to another aspect of the present invention, the ultrasonic solution separator further comprises a blower mechanism circulating the carrier gas between the ultrasonic atomization chamber and the collection portion, wherein the blower mechanism is provided on the outlet side of the ultrasonic atomization chamber and the inlet side of the collection portion. In this case, the internal pressure of the ultrasonic atomization chamber can be higher than the atmospheric pressure, while the internal pressure of the collection portion can be lower than the atmospheric pressure.

In an ultrasonic solution separator according to another aspect of the present invention, a solution or a powder is injected into the carrier gas on the path upstream from the collection portion or a circulation duct. Additionally, in an ultrasonic solution separator according to another aspect of the present invention, the collected solution, or particles capable of aggregating the mist are injected into the carrier gas.

In an ultrasonic solution separator according to another aspect of the present invention, a first spray vessel for spraying a solution into the carrier gas is connected to the outlet side where the carrier gas is ejected from the ultrasonic atomization chamber, while a second spray vessel for spraying a solution into the carrier gas is connected to the inlet side where the carrier gas is injected into the ultrasonic atomization chamber. In the ultrasonic solution separator, a solution stored in the first spay vessel is sprayed into the second spray vessel, while a solution stored in the second spay vessel is sprayed into the first spray vessel.

In an ultrasonic solution separator according to another aspect of the present invention, the collection portion includes a permeable membrane having a pore size that is larger than a particle of a solvent of the solution and is smaller than a particle of the target material. The target material is separated by selectively passing the particle of the solvent contained in the mist or vapor, which is produced in the ultrasonic atomization chamber, by means of the permeable membrane. Additionally, in an ultrasonic solution separator according to another aspect of the present invention, the permeable membrane can be made of material including any of zeolite, cellulose, carbon, silica and ceramic.

In an ultrasonic solution separator according to another aspect of the present invention, the ultrasonic solution separator further comprises a secondary collection portion collecting vapor of the target material ejected from the collection portion by absorbing the vapor of the target material by means of an absorbent. The secondary collection portion is connected to the collection portion. The collection portion aggregates and collects the mist produced in the ultrasonic atomization chamber. The secondary collection portion collects the vapor of the target material by absorbing the vapor of the target material by means of the absorbent.

In an ultrasonic solution separator according to another aspect of the present invention, the collection portion aggregates and collects the mist which is produced in the ultrasonic atomization chamber and is transported with the carrier gas to the collection portion, and the secondary collection portion collects the vapor of the target material included in the carrier gas, which is collected by the collection portion. Additionally, in an ultrasonic solution separator according to another aspect of the present invention, the collection portion includes a cooling heat exchanger for cooling the carrier gas, and the target material included in the carrier gas is separated from the carrier gas by cooling the carrier gas by means of the cooling heat exchanger.

Furthermore, in an ultrasonic solution separator according to another aspect of the present invention, the secondary collection portion includes a rotary rotor having a void, through which the carrier can pass in its rotation axis direction and which is provided with the absorbent. The rotor rotates movably between an absorption area and a regeneration area. The carrier gas including the vapor of the target material passes through the void, and the target material included in the carrier is absorbed into the absorbent, when the rotor moves to absorption area, while the absorbed target material is ejected, and the ejected target material is collected, when the rotor moves to the regeneration area.

Furthermore, in an ultrasonic solution separator according to another aspect of the present invention, a collection path separating the target material, which is absorbed to the absorbent, is connected to the regeneration area of the rotor. The collection path is connected to a heater heating the collected gas. A blower mechanism passes the collected gas, which is heated by the heater, through a path of the regeneration area of the rotor. A condensation heat exchanger collecting the target material by cooling the collected gas, which passes through the void of the regeneration area of the rotor and includes the target material. In the ultrasonic solution separator, the collected gas, which is heated by the heater, passes through the regeneration area, and the collected gas, which passes through the regeneration area, is cooled by the condensation heat exchanger, whereby the target material included in the gas is aggregated and collected.

Furthermore, in an ultrasonic solution separator according to another aspect of the present invention, the absorbent is any of, or a mixture of two or more of zeolite, activated carbon, lithium hydroxide and silica gel.

In an ultrasonic solution separator according to another aspect of the present invention, the ultrasonic oscillator is watertightly fixed to a detachable plate, and the detachable plate is watertightly and detachably attached to a casing of the ultrasonic atomization chamber. In the ultrasonic solution separator the detachable plate is attached to the casing of the ultrasonic atomization chamber whereby the ultrasonic oscillator can oscillate the solution in the ultrasonic atomization chamber at an ultrasonic frequency.

Furthermore, in an ultrasonic solution separator according to another aspect of the present invention, the detachable plate includes a front side plate and a backside plate, which are laminated and watertightly sandwich the ultrasonic oscillator between them. An oscillation surface is positioned in a through hole, which is provided in the front side plate so that the front side plate and the backside plate sandwich the ultrasonic oscillator between them.

Furthermore, in an ultrasonic solution separator according to another aspect of the present invention, the backside plate is provided with a recessed portion, in which the ultrasonic oscillator is fitted, on its surface opposed to the front side plate.

In an ultrasonic solution separator according to another aspect of the present invention, the ultrasonic solution separator further comprises a blower mechanism, which blows to a liquid column generated on the surface of the solution by ultrasonic oscillation of the ultrasonic oscillator so that the liquid column bends in the direction that is parallel to the surface of the solution.

Furthermore, in an ultrasonic solution separator according to another aspect of the present invention, the ultrasonic solution separator further comprises a bubble generator providing bubbles to the solution of the ultrasonic atomization chamber. Additionally, in an ultrasonic solution separator according to another aspect of the present invention, the ultrasonic solution separator further comprises a temperature control mechanism for keeping the temperature of the solution of the ultrasonic atomization chamber not higher than 30° C.

Furthermore, in an ultrasonic solution separator according to another aspect of the present invention, a shield is provided for shielding the surface of the solution from a gas in the ultrasonic atomization chamber whereby preventing vaporization of the solution into the gas is provided on the surface of the solution. The shield is provided with a through hole, from which the liquid column protrudes, wherein an outlet is arranged to eject the solution provided on the upper surface of the shield whereby separating the solution provided on the upper surface of the shield from the solution of the ultrasonic atomization chamber.

In an ultrasonic solution separator according to still another aspect of the present invention, the ultrasonic atomization chamber is connected to a solution supply pipe supplying the solution thereto. The solution supply pipe supplies the solution into the interior space portion of the ultrasonic atomization chamber and includes the ultrasonic oscillator. The solution supply pipe ejects the solution while oscillating the solution at an ultrasonic frequency inside the solution supply pipe by means of the ultrasonic oscillator whereby producing the mist of solution.

Figure 1:
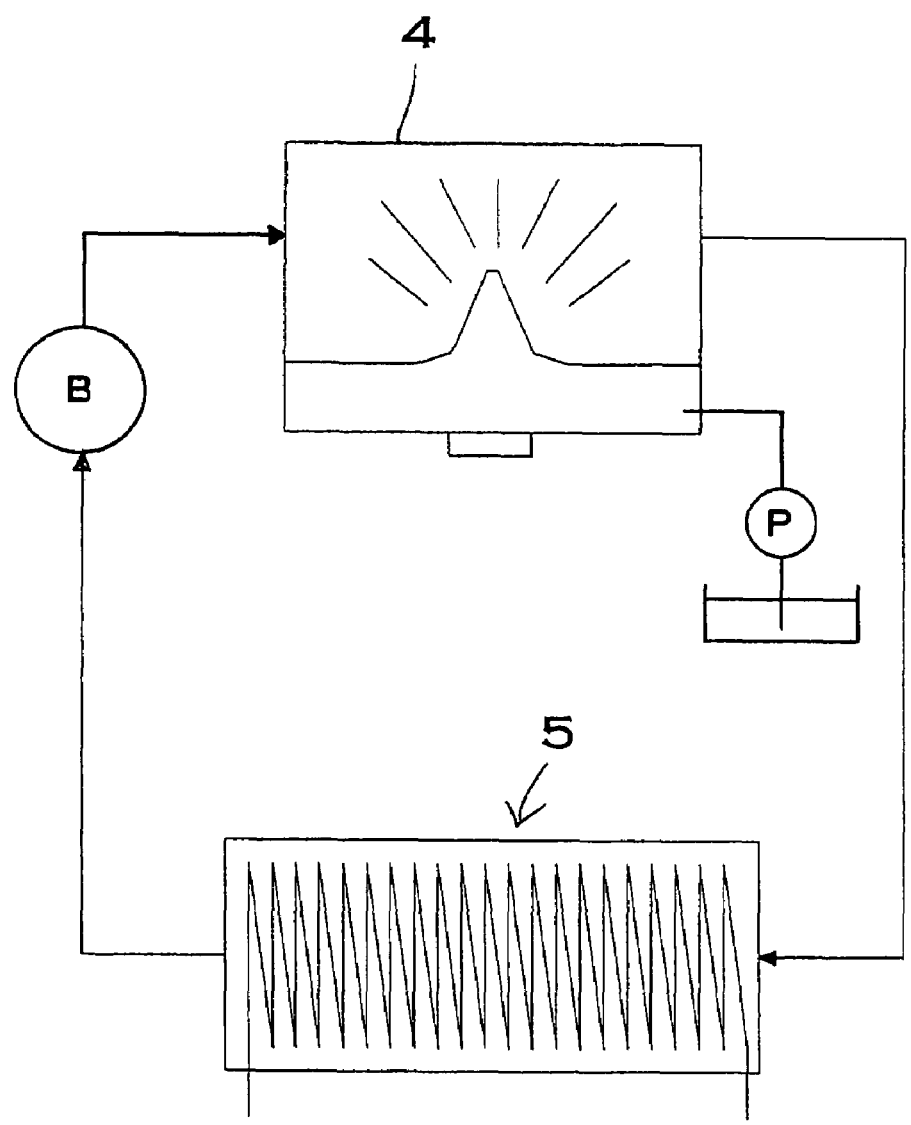
FIG. 1 is a diagram schematically showing a conventional ultrasonic separator.

(1) Sake, beer, wine, vinegar, mirin (rice cooking wine), spirits, shochu, brandy, whiskey and liqueur.

(2) Solutions containing perfumes such as pinene, linalool, limonene and polyphenol group, and aromatic compounds or fragrant compounds.

(3) Solutions containing alkane and cycloalkane, which are saturated hydrocarbon, alkene, cycloalken and alkyne, which are unsaturated hydrocarbon, any of organic compounds classed as a group of ether, thioether and aromatic hydrocarbon, or a compound consisting of bounded two or more of them.

(4) Solutions containing compounds obtained by substituting a halogen(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(5) Solutions containing compounds obtained by substituting a hydroxy group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(6) Solutions containing compounds obtained by substituting an amino group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(7) Solutions containing compounds obtained by substituting a carbonyl group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(8) Solutions containing compounds obtained by substituting a carboxyl group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(9) Solutions containing compounds obtained by substituting a nitro group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(10) Solutions containing compounds obtained by substituting a cyano group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(11) Solutions containing compounds obtained by substituting a mercapto group(s) for at least one hydrogen atom or functional group of alkane and cycloalkane, which are saturated hydrocarbon, alkene, cycloalken and alkyne, which are unsaturated hydrocarbon, any of organic compounds classed as group of ether, thioether and aromatic hydrocarbon, or a compound consisting of bounded two or more of them.

(12) Solutions containing compounds obtained by substituting a metal ion(s) for at least one atom of the target materials mentioned in (3) to (11).

(13) Solutions containing compounds obtained by substituting an arbitrary molecule(s) of molecules mentioned in (3) to (11) for an arbitrary hydrogen atom(s), carbon atom(s) or functional group(s) included in the target materials mentioned in (3) to (11).

The target materials contained in the above solutions quickly move to their surfaces and exhibit the characteristics of surface excess. The concentrations of these target materials are high at the surfaces. Accordingly, when mist is produced from the surfaces of these solutions by oscillating them at an ultrasonic frequency, the mist has highly concentrations of the target materials. Therefore, aggregating and collecting the mist can make the concentrations of the target materials high. That is, a compound containing a high concentrated target material can be separated from the solution.

The following description will describe an apparatus for separating a high concentrated alcohol from a solution containing an alcohol as a target material. However, a target material is not limited to an alcohol. Any target materials, which quickly move and exhibit the characteristics of surface excess, can be separated.

FIGS. 2 to 11 show ultrasonic separators according to the present invention. In an embodiment, components that are the same as or similar to those of the other embodiments are attached with numerals with the same last digit(s) of reference numerals except the first two digits of numerals. The ultrasonic separator shown in each of these figures comprises an ultrasonic atomization chamber 104, an ultrasonic atomization device 101, a collection portion 105 and a blower mechanism 1037. The ultrasonic atomization chamber 104 has a seal structure, and is supplied with a solution. The ultrasonic atomization device 101 produces mist from the solution in the ultrasonic atomization chamber 104 by ultrasonic oscillation, and includes one or more ultrasonic oscillator(s) and a power supply for ultrasonics. The collection portion 105 aggregates and collects the mist produced by the ultrasonic atomization device 101. The blower mechanism 1037 circulates the mist and a carrier gas between the ultrasonic atomization chamber 104 and the collection portion 105.

With these ultrasonic separators, the mist, which is produced from the solution in the ultrasonic atomization chamber 104, flows into the collection portion 105 with a seal structure. The collection portion 105 aggregates the fine mist, and further leads a vapor, which vaporizes from the mist, to condense to a liquid, and finally collects a highly concentrated alcohol.

The solution is supplied to the ultrasonic atomization chamber 104 by a pump 1010. The ultrasonic atomization chamber 104 does not atomize all the solution supplied thereto as mist. The reason is that, if all the solution is atomized into mist, and is collected by the collection portion 105, the concentration of a target material, such as an alcohol, in the solution collected by the collection portion 105 will be the same as the solution supplied to the ultrasonic atomization chamber 104. With the solution supplied to the ultrasonic atomization chamber 104, the concentration of the target material decreases as the amount of the solution decreases due to the atomization. Accordingly, the concentration of the target material contained in the mist also gradually decreases. The solution in the ultrasonic atomization chamber 104 is renewed into a fresh solution when the concentration of the target material decreases.

A solution containing the target material with a concentration of 10-50% by weight is atomized, for example, in the ultrasonic atomization chamber 104. When the concentration of the target material decreases, the solution in the ultrasonic atomization chamber 104 is renewed into a fresh solution. The solution is renewed in a manner, which periodically renews the solution into a fresh solution after a set period of time, i.e., in a batch manner. However, a fresh solution may be continuously supplied to the ultrasonic atomization chamber 104 from an undiluted solution tank 1011, which is connected thereto through the pump 1010 and stores a solution. With this apparatus, the ultrasonic atomization chamber 104 is supplied with a fresh solution from the undiluted solution tank 1011 while ejecting the solution therein, thus, the concentration of the target material such as an alcohol of the solution in the ultrasonic atomization chamber 104 is prevented from decreasing.

The solution in the ultrasonic atomization chamber 104 is atomized into mist by the ultrasonic atomization device 101. The mist produced by the ultrasonic atomization device 101 has a concentration of the target material that is higher than that in the solution. In this case, the ultrasonic atomization device 101 produces mist from the solution. The mist is aggregated and is collected. In addition, a vapor, which vaporizes from the mist, is collected. For that reason, a highly concentrated solution can be efficiently separated.

The solution in the ultrasonic atomization chamber 104 is ejected from the surface of the solution W as mist with a concentration higher than the solution in the ultrasonic atomization chamber 104 by means of ultrasonic waves. When the solution is oscillated at an ultrasonic frequency, a liquid column P appears on the surface of the solution W. The mist is produced from the surface of the liquid column P. With the ultrasonic atomization device 101 shown in FIG. 12, ultrasonic oscillators 102 of the ultrasonic atomization device 101 are arranged on the bottom of the ultrasonic atomization chamber 104. The ultrasonic oscillator 102 emits ultrasonic waves upward from the bottom toward the surface of the solution W, and oscillates the surface of the solution W at an ultrasonic frequency, and produces the liquid column P. The ultrasonic oscillator 102 emits ultrasonic waves in the vertical direction.

The ultrasonic atomization device 101 of FIG. 12 includes a plurality of the ultrasonic oscillators 102 and the power supply for ultrasonics 103, which oscillates these ultrasonic oscillators 102 at an ultrasonic frequency. The ultrasonic oscillators 102 are watertightly fixed on the bottom of the ultrasonic atomization chamber 104. The apparatus, which oscillates the solution by means of the plurality of ultrasonic oscillators 102, efficiently produces mist from the solution.

The plurality of ultrasonic oscillators 102 are watertightly fled on a detachable plate 1012, as shown in FIGS. 13 and 14. The detachable plate 1012, on which the plurality of ultrasonic oscillators 102 are fixed, is watertightly and detachably attached to a casing 1013 of the ultrasonic atomization chamber 104, as shown in FIGS. 15 and 16. The detachable plate 1012 is attached to the casing 1013 of the ultrasonic atomization chamber 104, thus, each ultrasonic oscillator 102 oscillates the solution in the ultrasonic atomization chamber 104 at an ultrasonic frequency.

The detachable plate 1012 shown in FIGS. 13 and 14 includes a front side plate 1012A and a backside plate 1012B. The front side plate 1012A and the backside plate 10128 are laminated and watertightly sandwich the ultrasonic oscillators 102 between them. The front side plate 1012A is provided with through holes 1012*a* opening thereon. The front side plate 1012A and the backside plate 1012B sandwich the ultrasonic oscillators 102 so that oscillation surfaces 102A are positioned in the through holes 1012*a*. The backside plate 1012B is provided with recessed portions 1012*b*, in which the ultrasonic oscillators 102 are fitted. With the detachable plate 1012 of FIG. 13, the recessed portion 1012*b* is provided in the backside plate 1012B, however, the recessed portion may be provided in the front side plate, in which the ultrasonic oscillator is fitted.

In order to achieve watertight sealing between the ultrasonic oscillator 102 and the front side plate 1012A, a packing member 1016 is sandwiched between them. With the ultrasonic atomization device 101 shown in FIG. 13, another packing member 1016 is also attached between the ultrasonic oscillator 102 and the backside plate 1012B in order to achieve watertight sealing between them. However, with the ultrasonic atomization device, the watertight sealing between the ultrasonic oscillator and the backside plate is not always necessary. The reason is that, when a detachable plate achieves watertight sealing between the ultrasonic oscillator and the front side plate, fixing the detachable plate on the lower surface of the casing of the ultrasonic atomization chamber can prevent leakage of the solution in the ultrasonic atomization chamber. The packing member 1018 is an O-ring of elastic rubber. The O-ring packing member 1016 is arranged on the outer periphery of the oscillation surface 102A of the ultrasonic oscillator 102 and a surface of the front side plate 1012A opposed thereto. The packing member 1016 achieves watertight sealing between the oscillation surface 102A of the ultrasonic oscillator 102 and the front side plate 1012A, thereby preventing leakage of water at this location. Additionally, the outer periphery of the ultrasonic oscillator 102 and the backside plate 1012B are watertightly connected.

The packing member 1016 is elastic rubber made of Teflon (registered trademark), silicon, natural or synthetic rubber, or the like. The packing members 1016 are sandwiched between the ultrasonic oscillator 102 and the front side plate 1012A, and between the ultrasonic oscillator 102 and the backside plate 1012B so as to be elastically deformed by thrusting the packing members 1016. Thus, the packing members 1016 come into intimate contact with the surfaces of the ultrasonic oscillator 102, the front side plate 1012A and the backside plate 1012B so as to watertightly seal their joint sections. Besides, the packing member 1016 may be a ring-shaped metal packing member made of copper, brass, aluminum or stainless steel.

With the detachable plate 1012 shown in FIGS. 13 and 14, the front side plate 1012A and the backside plate 1012B are connected to each other by hinges 1017 at one end of each of the plates. The front side plate 1012A and the backside plate 1012B of the detachable plate 1012 are pivotally opened, thus, the ultrasonic oscillators 102 can be easily removed. When the ultrasonic oscillators 102 are replaced, the front side plate 1012A and the backside plate 1012B are pivotally opened. After that, old ultrasonic oscillators are removed, and then new ultrasonic oscillators 102 and packing members 1016 are arranged into set positions. Subsequently, the front side plate 1012A and the backside plate 1012B are closed, thus, replacement of ultrasonic oscillators 102 is achieved. In addition, the closed backside plate 1012B and front side plate 1012A are secured at the end of each plate opposite to the hinges 1017 with a screw (not shown), or secured by fastening them together to the casing 1013 of the ultrasonic atomization chamber 104.

Figure 13:
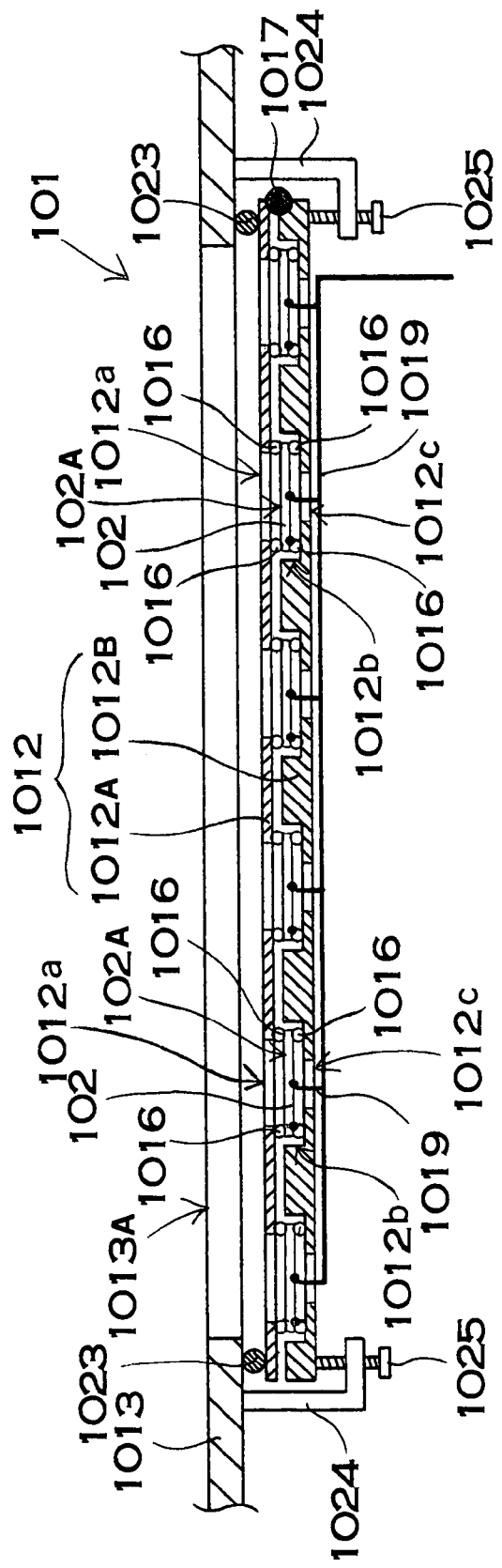
Figure 14:
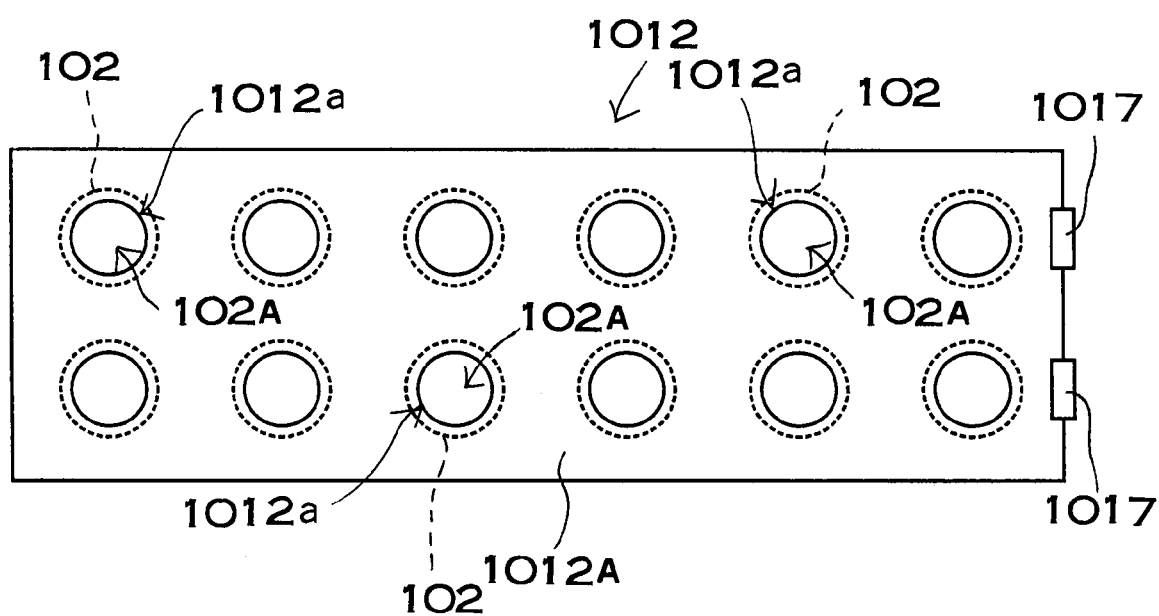
Figure 17:
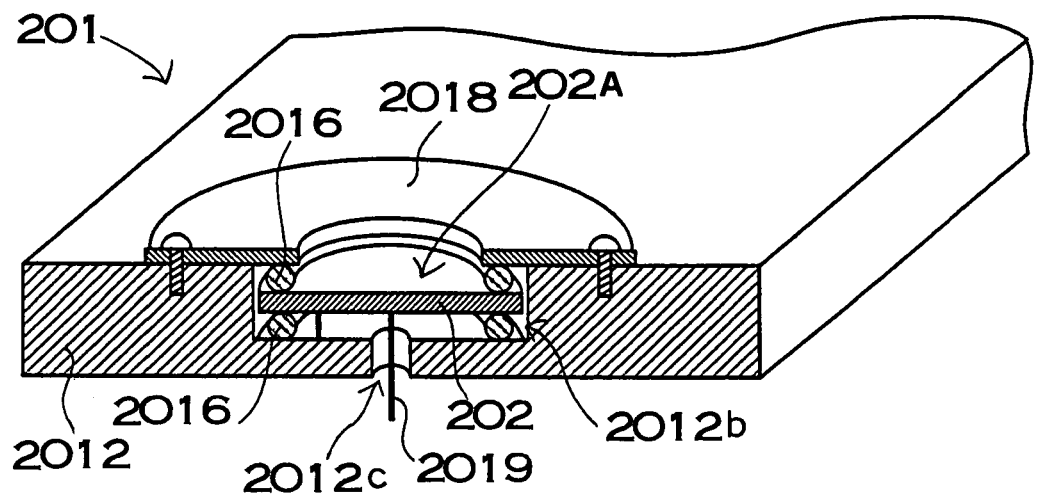
Figure 18:
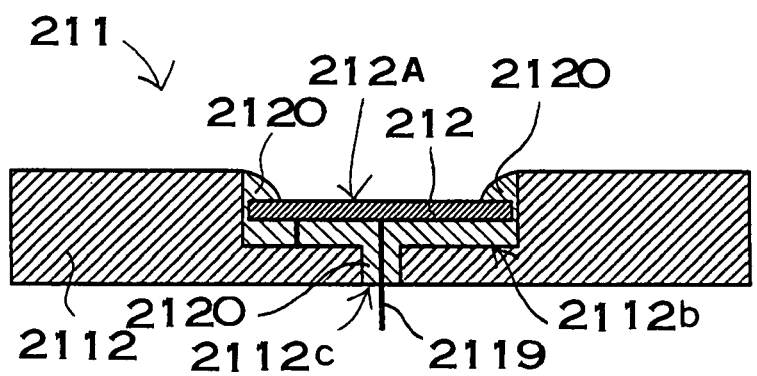
Figure 19:
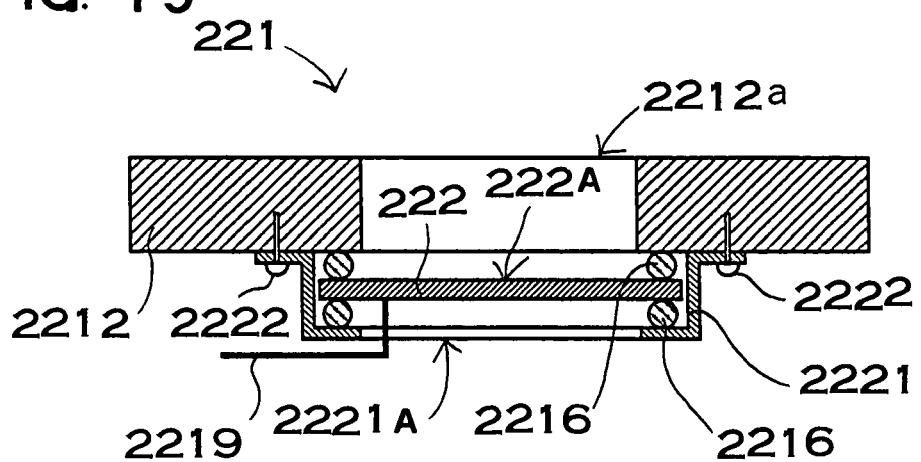

The above ultrasonic atomization device 101 achieves watertight sealing by means of the packing member 1016, however, the ultrasonic atomization device may achieve watertight sealing by filling the positions corresponding to the packing member with a caulking compound. Furthermore, the ultrasonic atomization device 101 shown in FIG. 13 is composed of two metal plates or rigid non-metal plates of the front side plate 1012A and the backside plate 1012B, which compose the detachable plate 1013, however, the detachable plate may be one plate as shown in FIGS. 17 to 19. This type of detachable plates 2012, 2112 and 2212 are metal plates or rigid non-metal plates. The detachable plates 2012 and 2112 are provided with recessed portions 2012b and 2112b, in which ultrasonic oscillators 202, 212 are disposed, thereon. The detachable plate 2212 is provided with a penetrating through hole 2212a, under which an ultrasonic oscillator 222 is positioned.

With the ultrasonic atomization device 201 of FIG. 17, the ultrasonic oscillator 202 is disposed in the recessed portion 2012b of the detachable plate 2012, and packing members 2016 are arranged on the upper and lower peripheries of the ultrasonic oscillator 202. Furthermore, a ring plate 2018 is fixed to an opening of the detachable plate 2012. The ring plate 2018 thrusts the packing member 2016 arranged on the upper surface of the ultrasonic oscillator 202, thus the ultrasonic oscillator 202 is watertightly secured in the recessed portion 2012b. The recessed portion 2012b is provided with a through hole 2012c on its bottom. A lead 2019 extends outward through the through hole 2012c.

With the ultrasonic atomization device 211 of FIG. 18, the ultrasonic oscillator 212 is watertightly adhered and secured to the recessed portion 2112b of the detachable plate 2112 by a caulking compound 2120 without using the packing member and the ring plate. The ultrasonic atomization device 211 includes a lead 2119, which also extends outward through a penetrating through hole 2112c on the bottom of the recessed portion 2112b. The through hole 2112c, through which the lead 2119 passes, is filled with the caulking compound 2120. Thus, watertight sealing between the through hole 2112c and the lead 2119 is achieved.

With the ultrasonic atomization device 221 of FIG. 19, the detachable plate 2212 is provided with a penetrating through hole 2212a. The ultrasonic oscillator 222 is secured to the lower surface of the detachable plate 2212 so that an oscillation surface 222A is positioned under the through hole 2212a. In order to secure the detachable plate to the ultrasonic oscillator 222, a securing member 2221 is fastened to the bottom of the detachable plate 2212. The ultrasonic oscillator 222 is watertightly secured to the detachable plate 2212 through packing members 2216 arranged on the upper and lower peripheries of the ultrasonic oscillator 222. The securing member 2221 is a stepped annular member, which has a recessed portion and an outer flange portion, and is fastened to the detachable plate 2212 by screwing fastening screws 2222, which penetrate the outer flange portion, in the detachable plate 2212. The securing member 2221 thrusts the packing member 2216 arranged on the lower surface of the ultrasonic oscillator 222 by the bottom of the recessed portion, thus the ultrasonic oscillator 222 is watertightly secured to the detachable plate 2212. The securing member 2221 is provided with a through hole 2221A on the bottom of the recessed portion. A lead 2219 extends outward through the through hole 2221A.

Figure 15:
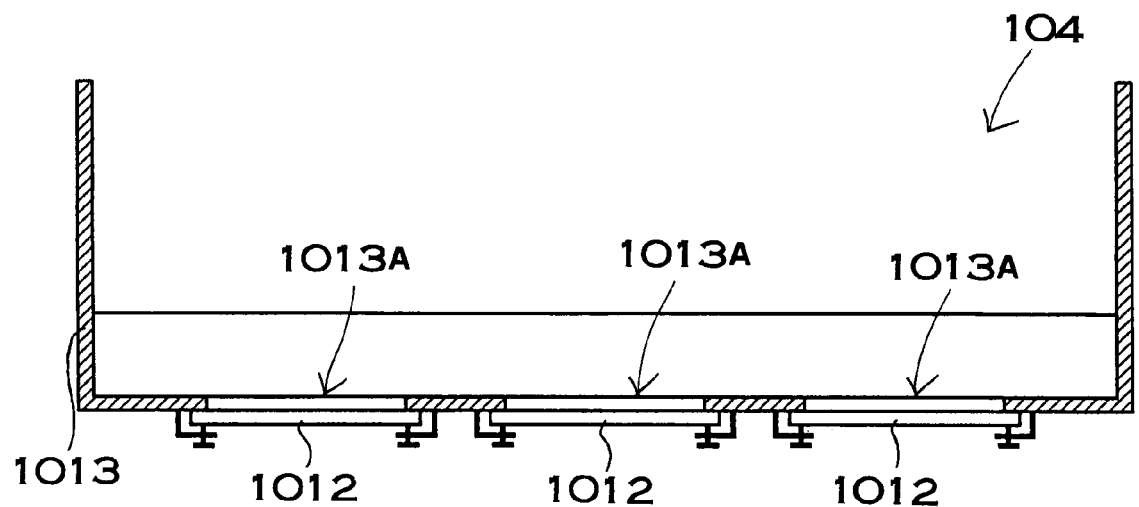
Figure 16:
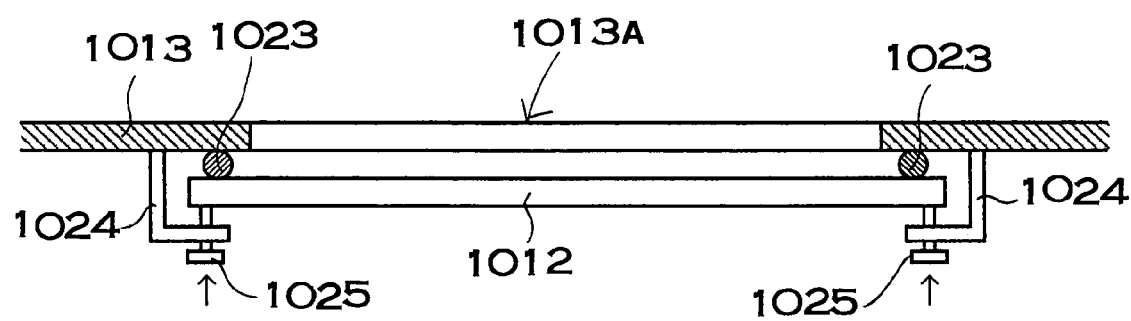

FIGS. 15 and 16 are views of the ultrasonic atomization device 101 fastened to the ultrasonic atomization chamber 104. The ultrasonic atomization chamber 104 shown in these figures is provided with openings 1013A on the bottom of the casing 1013. The detachable plate 1012 is secured to the ultrasonic atomization chamber 104 so that the openings 1013A are watertightly closed. The detachable plate 1012 is watertightly secured to the casing 1013 via a packing member 1023. Metal securing members 1024 are fastened to the bottom of the casing 1013, in order to secure the detachable plate 1012 thereto. The metal securing members 1024 are shaped in an L-shape. Fastening screws 1025, which penetrate the securing members 1024, thrust and fasten the detachable plate 1012 to the casing 1013 of the ultrasonic atomization chamber 104. The plurality of the ultrasonic oscillators 102, which are secured to the ultrasonic atomization chamber 104 in such a manner, oscillate the solution upward from the bottom of the casing 1013 at an ultrasonic frequency. The detachable plate 1012 is detachably mounted to the bottom of the casing 1013 of the ultrasonic atomization chamber 104 so that the openings 1013A are sealed.

Figure 20:
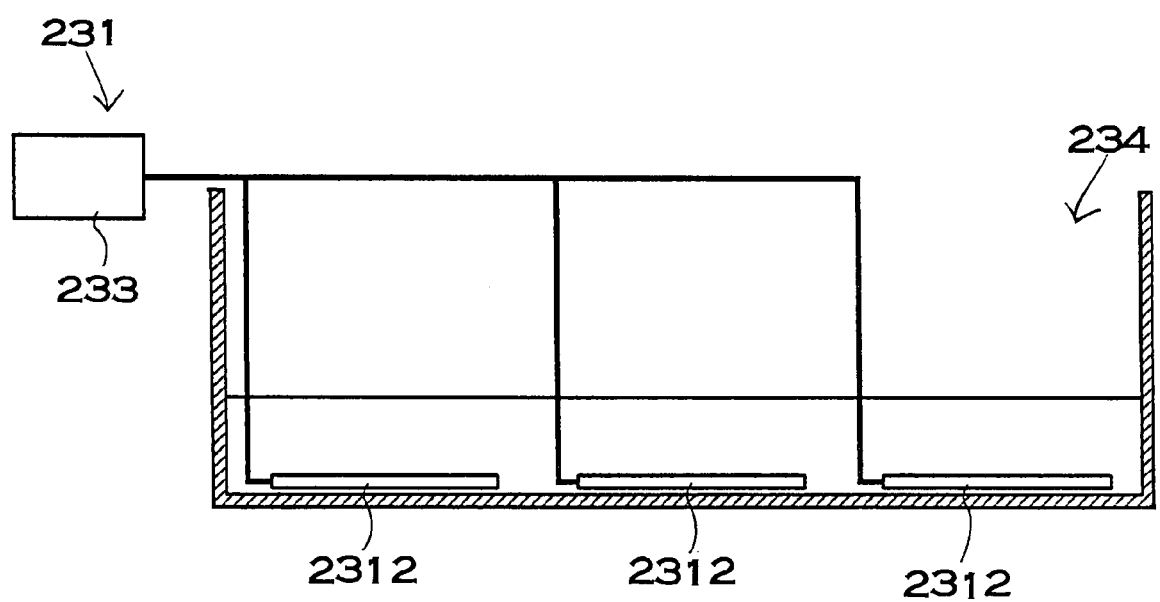
Figure 21:
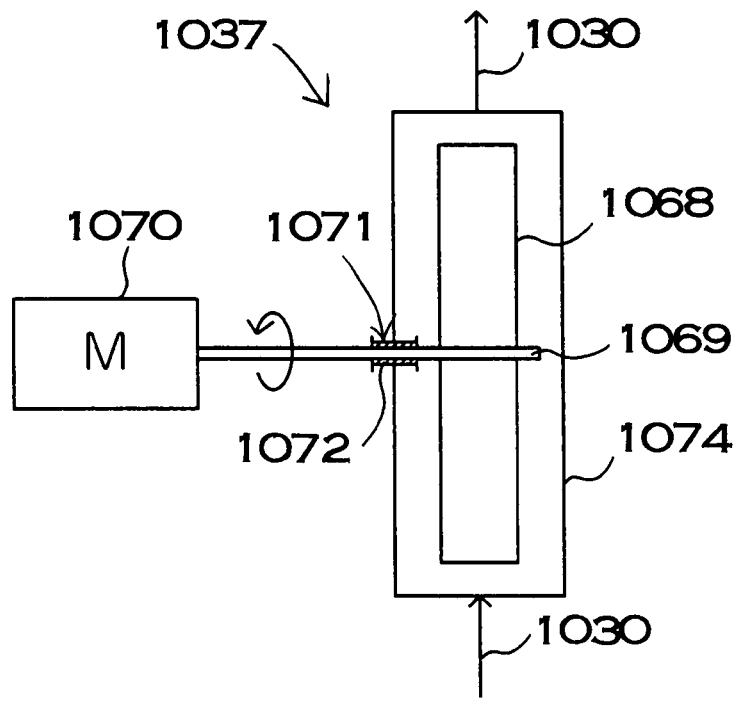
Figure 22:
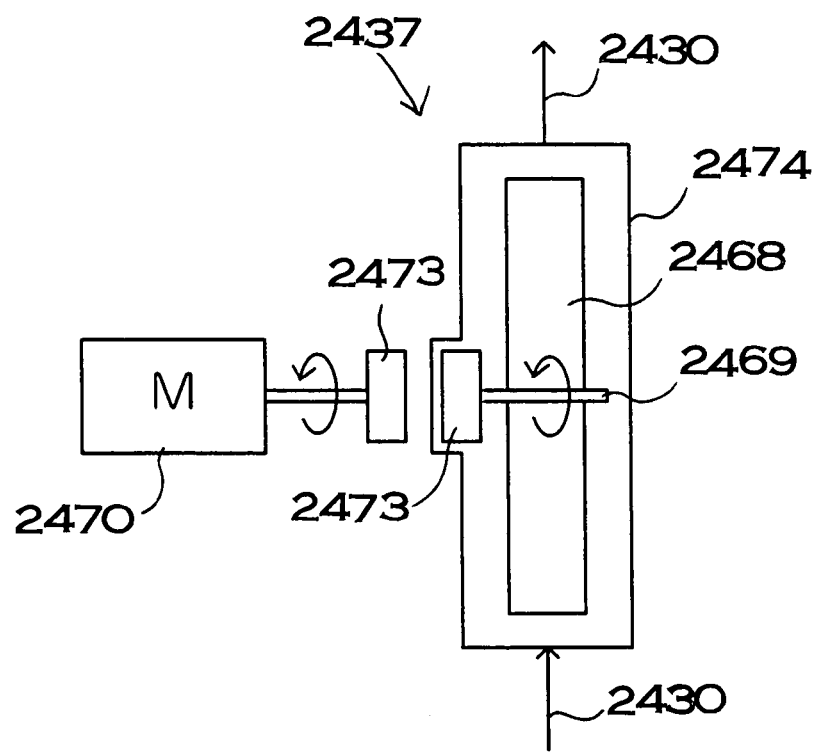
Figure 23:
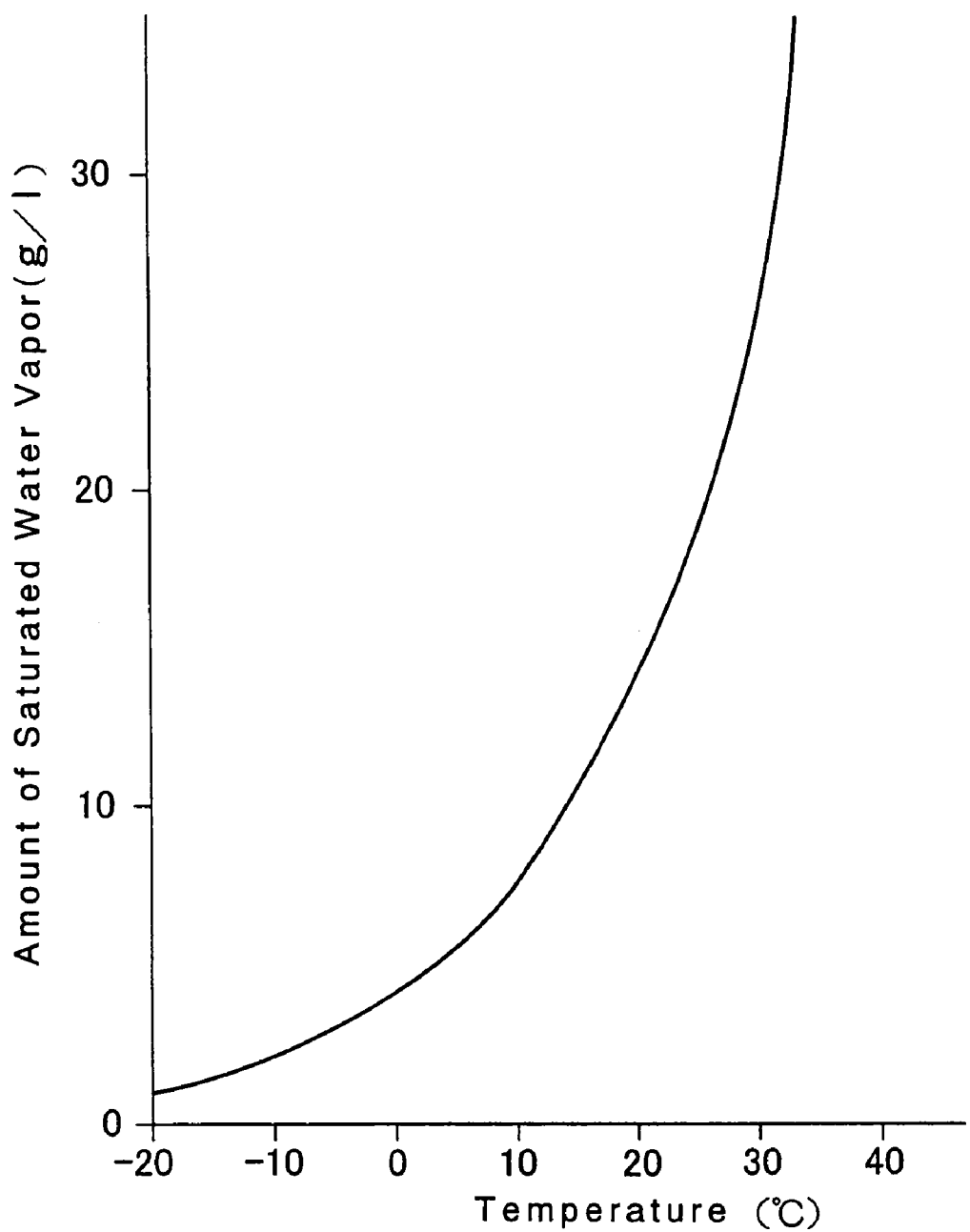
Figure 24:
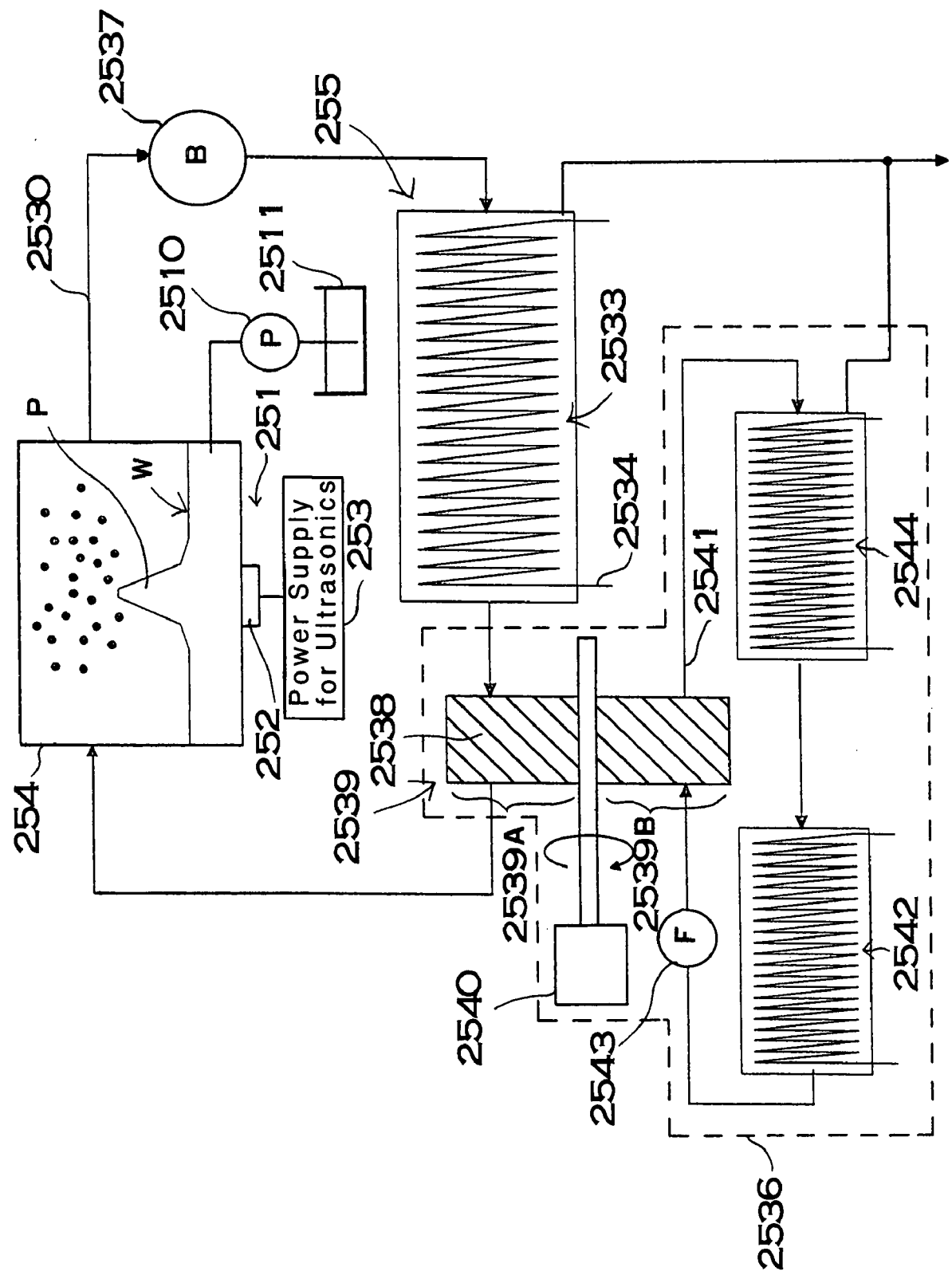

A detachable plate may be soaked in the solution of an ultrasonic atomization chamber 234 and oscillate the solution at ultrasonic frequency, as shown in FIG. 20. In this case, a detachable plate 2312 can be disposed in and easily removed from the ultrasonic atomization chamber 234. With an ultrasonic atomization device 231 that is soaked in the solution, the ultrasonic oscillator is watertightly secured to the detachable plate 2312 except its oscillation surface in the manner shown in FIG. 19, for example.

If the ultrasonic oscillator 102 or the power supply for ultrasonics 103 heats the solution in the ultrasonic atomization chamber 104, the solution deteriorates. Forcedly cooling the ultrasonic oscillator 102 can solve this problem. Furthermore, the power supply for ultrasonics 103 is preferably also cooled. The power supply for ultrasonics 103 does not directly heat the solution, but heats the surroundings thereof. Thus, the power supply for ultrasonics 103 indirectly heats the solution. As shown in FIG. 12, a cooling pipe 1014 is thermally connected to the ultrasonic oscillator 102 and the power supply for ultrasonics 103, in other words, in contact with them, thereby cooling them. The cooling pipe 1014 cools the ultrasonic oscillator 102 and the power supply for ultrasonics 103 by running a liquid or refrigerant, which is cooled by a cooling device, or cooling water such as groundwater and running water.

As mentioned above, the solution in the ultrasonic atomization chamber 104 is atomized into mist by the ultrasonic atomization device 101. The ultrasonic separator shown in each of FIGS. 2 to 10 includes one ultrasonic atomization chamber 104. However, an ultrasonic separator according to the present invention may includes a plurality of ultrasonic atomization chambers 194, as shown in FIG. 11. The plurality of ultrasonic atomization chambers 194 are preferably stacked in order to reduce their footprint. The plurality of stacked ultrasonic atomization chambers 194 are connected in parallel by a duct, as shown in FIG. 11, or are connected in series, though not illustrated.

The mist produced in the ultrasonic atomization chamber 104 is transported with the carrier gas to the collection portion 105. In order for the mist to flow into the collection portion 105, the collection portion 105 is connected to the ultrasonic atomization chamber 104 by a circulation duct 1030. With the ultrasonic solution separator according to the present invention, the temperature of carrier gas in the ultrasonic atomization chamber 104 is at least 5° C. higher than the carrier gas in the collection portion 105. The reason is that the mist can be efficiently produced from the solution in the ultrasonic atomization chamber 104, and additionally the target material included in the mist can be collected by the collection portion 105 so that a high-concentrated solution is efficiently separated. With the ultrasonic separator, in addition, the temperature of carrier gas in the ultrasonic atomization chamber 104 is preferably 10° C. higher, more preferably 20° C. higher than the carrier gas in the collection portion 105. Thus, the ultrasonic separator can more efficiently produce the mist from the solution in the ultrasonic atomization chamber 104, and additionally collect the target material included in the mist by means of the collection portion 105.

Furthermore, the height of an interior space portion 104A from the surface of the solution W in the ultrasonic atomization chamber 104 is not higher than 50 cm, preferably not higher than 30 cm. The reason is that the mist can be effectively produced from the solution in the ultrasonic atomization chamber 104. In addition, in the interior space portion 104A of the ultrasonic atomization chamber 104, the flow velocity of the blown carrier gas is preferably not less than 0.01 m/s. The blower mechanism 1037 circulates the carrier gas in the circulation duct 1030 whereby the flow velocity of the carrier gas passing through the ultrasonic atomization chamber 104 is not less than 0.01 m/s. Moreover, with the ultrasonic solution separator, the blower mechanism 1037 transports the carrier gas so as to keep the ratio F/V (1/min.) of the volume V (liter) of the interior space portion 104A to the flow rate of the carrier gas F (liter/min.) of the ultrasonic atomization chamber 104 not less than 1. Since the ratio FN is not less than 1, the carrier gas, which is circulated into the interior space portion 104A of the ultrasonic atomization chamber 104, is renewed into a fresh one at the period of less than at least one minute.

The ultrasonic separator shown in FIG. 2 includes a vapor heater 1047 for heating the carrier gas, which is circulated into the ultrasonic atomization chamber 104. With the ultrasonic separator, the carrier gas ejected from the collection portion 105 is heated by the vapor heater 1047, and is circulated into the ultrasonic atomization chamber 104. The vapor heater 1047 is a heat exchanger, and heats the carrier gas whereby the temperature of the carrier gas in the ultrasonic atomization chamber 104 is at least 5° C., preferably at least 10° C. higher than that in the collection portion 105. With the ultrasonic separator shown in the figure, the vapor heater 1047 is provided on the outlet side of the collection portion 105, and the inlet side of the ultrasonic atomization chamber (4).

Furthermore, the ultrasonic separator shown in FIG. 3 includes a solution heater 1148 for heating the solution in an ultrasonic atomization chamber 114. The solution heater 1148 heats the solution in the ultrasonic atomization chamber 114. With the ultrasonic atomization chamber 114, the carrier gas therein is heated by heating the solution therein by means of the solution heater 1148. With the ultrasonic separator, the solution heater 1048 heats the solution in the ultrasonic atomization chamber 114 whereby the temperature of the carrier gas in the ultrasonic atomization chamber 114 is at least 5° C. higher, preferably at least 10° C. higher than that in a collection portion 115. With this ultrasonic separator, an ultrasonic atomization device 111 produces the mist from the solution in the state that the solution in the ultrasonic atomization chamber 114 is heated. The ultrasonic oscillates the solution in the ultrasonic atomization chamber 114 while heating the solution to boiling state for example, and thus can very efficiently produce the mist from the solution.

The collection portion 105 aggregates and collects the produced mist, which is transported with the carrier gas, and condenses and collects a vapor vaporizing from the mist. When the carrier gas is transported from the ultrasonic atomization chamber 104 to the collection portion 105, the collection portion 105 lowers the temperature of the carrier gas at least 5° C. higher, preferably at least 10° C. The reason is that the produced mist is effectively aggregated, and the target material, which is included as vapor by the carrier gas, becomes supersaturated and is condensed to a liquid. The condensate target material becomes droplets and is collected.

The collection portion 105 shown in each of FIGS. 2, 3, 6, 8, and 11 includes a heat exchanger 1033 for cooling and aggregating the mist therein. With the cooling heat exchanger 1033, the fin (not shown) is fixed to a heat exchange pipe 1034. A refrigerant or cooling water for cooling is circulated through the heat exchange pipe 1034, thus, the cooling heat exchanger 1033 is cooled. The mist produced by the ultrasonic atomization chamber 104 partially vaporizes, and is included in the carrier gas. When the carrier gas is cooled by the cooling heat exchanger 1033 of the collection portion 105, the vapor included in the carrier gas condenses to a liquid, aggregates, and is collected. The fine droplets of the mist, which flow with the carrier gas into the collection portion 105, collide with the cooling heat exchanger 1033 or with each other, and aggregate to become larger, or with the fin or the like of the cooling heat exchanger 1033, and aggregate to become larger, and thus are collected as a solution. The carrier gas, from which the mist and vapor are aggregated and collected by the cooling heat exchanger 1033, is circulated into the ultrasonic atomization chamber 104 again through the circulation duct 1030.

A plurality of sheets of baffle (not shown) may be provided in the collection portion. Each sheet of the baffle is spaced at an interval where the mist can pass from an adjacent sheet in the vertical posture. The mist collides with the surface of the vertical baffle and is aggregated as a solution thereon, and then the solution spontaneously falls and can be collected. The baffle may have asperities on its surface whereby the mist more effectively comes in contact with the surface and is collected.

Furthermore, a fan (not shown), which forcedly blows and agitates the carrier gas, may be provided in the collection portion 105. The fan blows the carrier gas in the collection portion and agitates the mist and vapor. The droplets of the agitated mist collide with each other and aggregate, or collide with the surface of the baffle and aggregate. The mist, the droplet of which aggregates or aggregate, quickly falls and is collected.

Furthermore, a mist oscillator (not shown) for oscillating the mist may be provided. This type of mist oscillator can increase the probability of collision of the mist. The mist oscillator includes an electrical-to-mechanical oscillation converter, which oscillates the carrier gas of the collection portion, and a power supply for oscillation, which drives the electrical-to-mechanical oscillation converter. The electrical-to-mechanical oscillation converter is a speaker for emitting a sound at audio frequency, an ultrasonic oscillator for emitting ultrasonic waves, the frequency of which is higher than an audio frequency, or the like. In order that the electric oscillation-mechanical oscillation converter may efficiently oscillate the mist, the oscillation emitted from the electrical-to-mechanical oscillation converter is resonated by the collection portion. In order to achieve this resonation, the electrical-to-mechanical oscillation converter oscillates at the frequency resonating with the collection portion. In other words, the collection portion is designed in the shape, which is resonated with the oscillation emitted from the electrical-to-mechanical oscillation converter.

Ultrasonic waves involve frequencies above the range of human hearing. Accordingly, with the mist oscillator emitting ultrasonic waves, even if the gas in the collection portion is intensively oscillated, in other words, even if the power of the electrical-to-mechanical oscillation converter is very high, the mist oscillator does not disturb a human with sound. Therefore, ultrasonic waves have an advantage that can intensively oscillate the mist, and effectively collide the droplets of the mist with each other, and quickly collect the mist.

Figure 4:
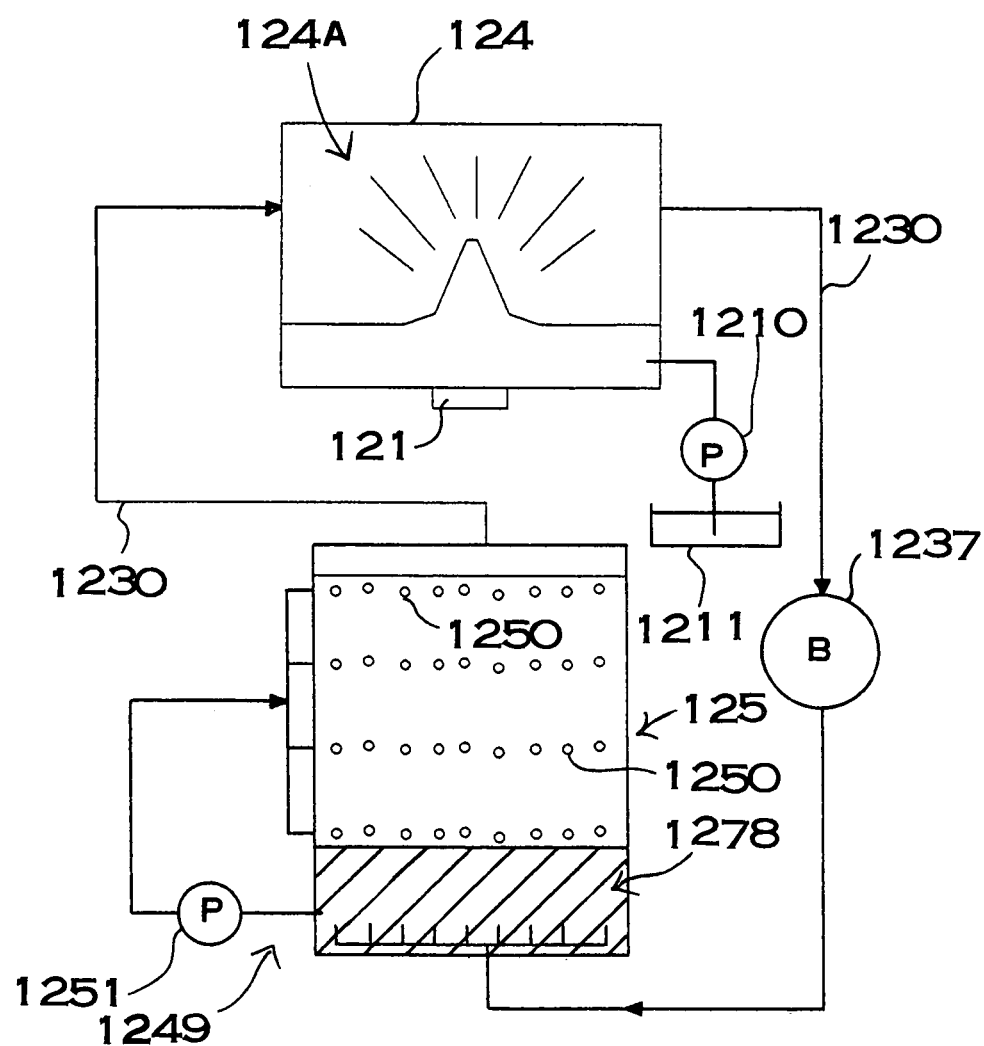
FIG. 4 is a diagram schematically showing an ultrasonic separator according to another embodiment of the present invention.

Furthermore, the collection portion may have a configuration shown in FIG. 4. A collection portion 125 shown in FIG. 4 is a closed chamber, and includes a scrubber 1249 in order to collect the mist supplied thereto more quickly. This collection portion 125 includes a storage portion 1278, which stores the collected solution, on its bottom. The carrier gas is supplied to the stored solution. This collection portion 125 passes the produced mist, which is included in the carrier gas, and the vapor, which vaporizes, through the solution in the storage portion 1278, and collects them. The scrubber 1249 includes a plurality of nozzles 1250, which spray the solution. The nozzles 1250 are connected to the storage portion 1278, which is the bottom part of the collection portion 125 through a circulation pump 1251. The circulation pump 1251 sucks in the solution collected by the collection portion 125, and allows the nozzle 1250 to spray the solution. The solution sprayed from the nozzles 1250 quickly falls inside the closed chamber. When falling, the solution sprayed from the nozzles 1250 collides with the mist and vapor, which pass through and is suspended above the solution in the storage portion 1278 in the collection portion 125, and thus falls while collecting them. Accordingly, the mist and vapor, which are transported to the collection portion 125, are efficiently and quickly collected. However, though not illustrated, the collection portion may also include a spray tower instead of the scrubber. In addition, though not illustrated, the collection portion may also include the scrubber or a spray tower, and additionally collect the mist in the carrier gas by means of any one of, or a combination of two or more of cyclone, punched plate provided with numbers of small holes, wire mesh demister, chevron, filter, capillary and honeycomb after contacting the collected solution with the mist in the carrier gas. This collection portion can more efficiently collect the mist.

Moreover, though not illustrated, the collection portion may include all the nozzle(s) for spraying the solution, the fan for agitating the mist and the oscillator for oscillating the mist therein. Thus, the collection portion can most effectively aggregate the mist. In addition, the collection portion may include two of the devices for aggregating the mist therein, and thus can effectively aggregate the mist.

Figure 5:
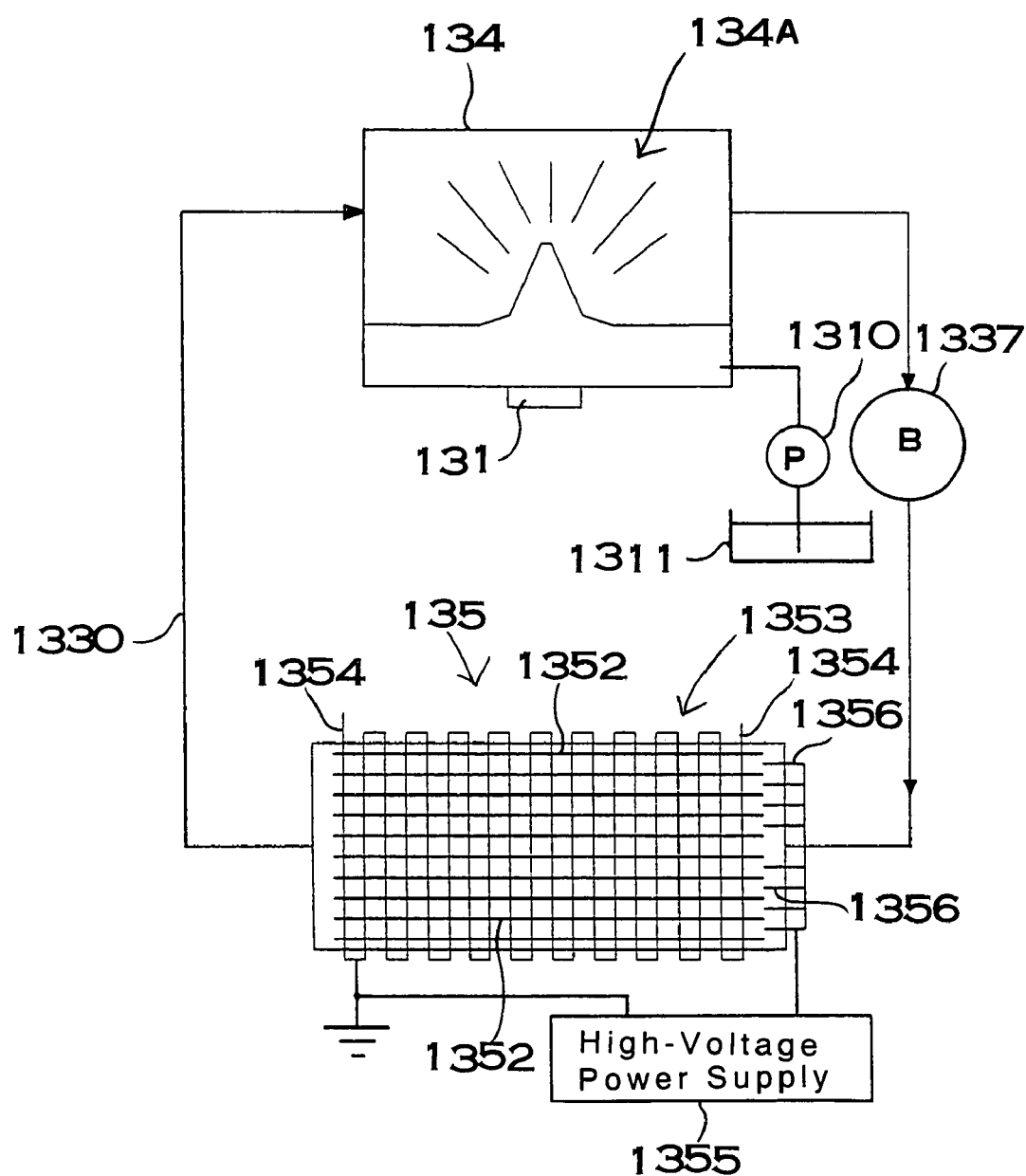
FIG. 5 is a diagram schematically showing an ultrasonic separator according to another embodiment of the present invention.
Figure 6:
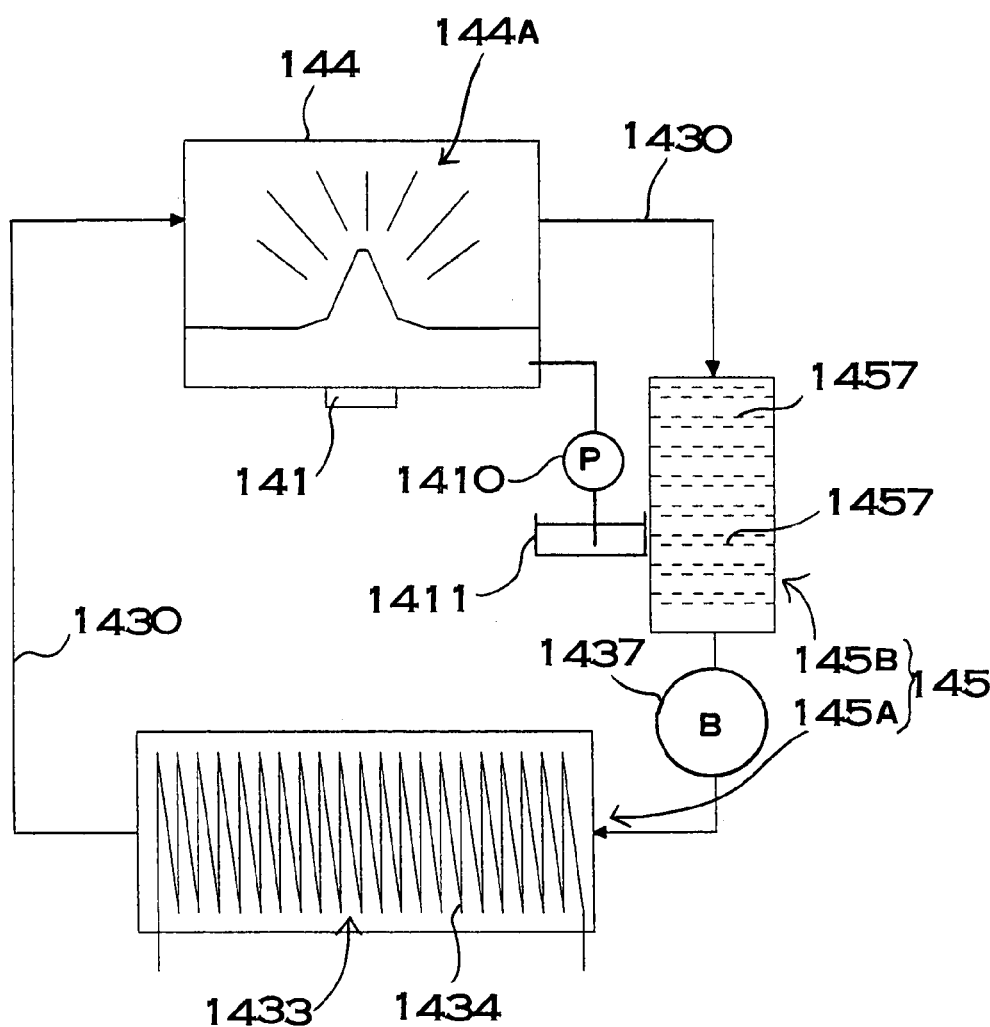
FIG. 6 is a diagram schematically showing an ultrasonic separator according to another embodiment of the present invention.

A collection portion 135 shown in FIG. 5 includes a conductive metal plate 1352 and a cooler 1353, which cools this metal plate 1352. This collection portion 135 cools the metal plate 1352 by means of the cooler 1353 whereby the mist and vapor, which are included in the carrier gas, are cooled and aggregated. With the cooler 1353, the metal plate 1352 is fixed to a heat exchange pipe 1354. A cooling fin can be used as the metal plate 1352, for example. With the cooler 1353, a refrigerant and cooling water for cooling are circulated around the heat exchange pipe 1354 to cool the metal plate 1352. In addition, the collection portion 135 shown in the figure includes the high-voltage power supply 1355, which generates the electrostatic field. With this collection portion 135, one terminal of the high voltage power supply 1355 is connected to the metal plate 1352, while another terminal is connected to a counter electrode 1356 opposed to the metal plate 1352. The high voltage power supply 1355 generates an electrostatic field in the collection portion 135, and charges the mist and vapor included in the supplied carrier gas whereby the mist and vapor are absorbed onto the metal plate 1352 by electrostatic attraction forces. The mist absorbed to the metal plate 1352 aggregates and is collected. The vapor absorbed to the metal plate 1352 condenses to a liquid and aggregates, and then is collected. The surface of the metal plate 1352 can be coated with a conductive water repellent. With this metal plate, the droplets, which aggregate on its surface, quickly fall, and the target material can be effectively collected.

Figure 7:
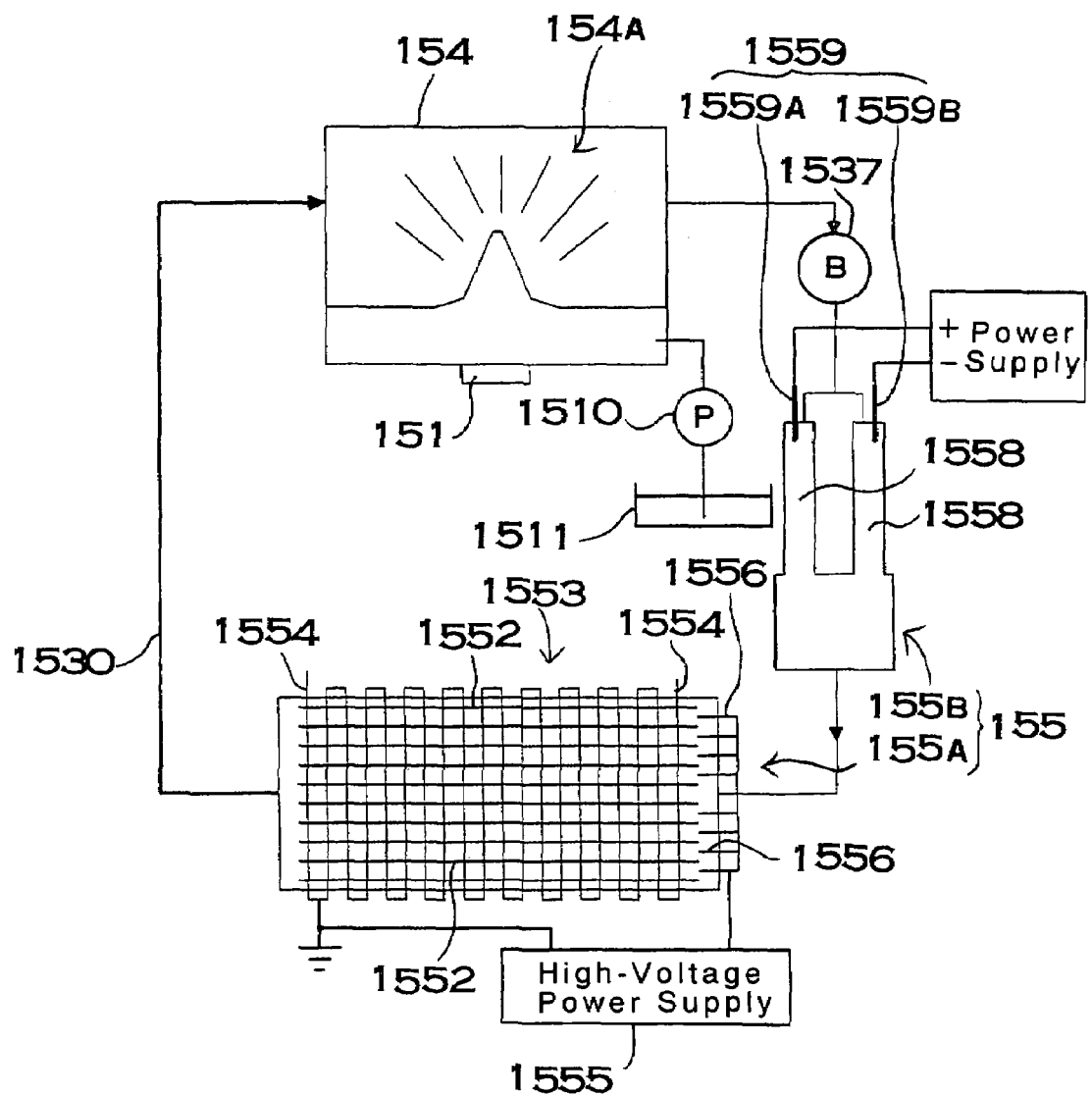
FIG. 7 is a diagram schematically showing an ultrasonic separator according to another embodiment of the present invention.

Furthermore, the collection portion can include a main collection portion and a primary collection portion connected upstream to the main collection portion. The main collection portion can be composed of any one of, or two or more of foregoing collection portions. The primary collection portion includes any one of, or two or more of cyclone, punched plate, wire mesh demister, chevron, filter, capillary, honeycomb or a device for collecting the mist by means of electrostatic attraction forces, for example. With the collection portions 145 and 155 shown in FIG. 6 and FIG. 7, one primary collection portion 145B or 155B is connected to the inlet side or upstream side of the main collection portion 145A or 155A. These primary collection portions 145B and 155B aggregate and collect the mist and vapor, which are included in the carrier gas transported to the collection portions 145 and 155 from the ultrasonic atomization chambers 144 and 154, in advance of the main collection portions 145A and 155A.

With the primary collection portion 145B shown in FIG. 6, a plurality of punching plates 1457 provided with numbers of small holes are arranged in parallel to each other in a closed chamber. The plurality of punching plates 1457 are arranged vertically relative to the transport direction of the carrier gas. With this primary collection portion 145B, the carrier gas passes through the numbers of holes opening on the punched plates 1457, and the mist collides with the surface of the punched plate 1457, and the solution aggregates thereon. Thus, the primary collection portion 145B collects the solution that aggregates on and spontaneously falls from the punched plates 1457.

A primary collection portion 155B shown in FIG. 7 is a device, which collects the mist with electrostatic attraction forces. With this primary collection portion 155B, a pair of branch paths 1558 is provided on the inlet side of the carrier gas. In order to electrically charge the mist flowing thereto, a pair of electrodes 1559 is arranged in the pair of branch paths 1558. A positive electrode 1559A is provided in one branch path 1558, while a negative electrode 1559B is provided in another branch path 1558. The mist flowing into them is electrically charged by applying voltage to these electrodes 1559. With this primary collection portion 155B, the positively-charged mist and the negatively-charged mist are ejected from the respective branch paths 1558, and aggregate due to electrostatic forces. Accordingly, this primary collection portion has an advantage in that it can effectively aggregate the mist of fine liquid droplets. In the embodiment of FIG. 7, this type of collection device is used as the primary collection portion 155B, however, this type of collection device may be used as the main collection portion.

Since the above ultrasonic separator includes the device, which effectively aggregates the mist and vapor, the mist and the vapor more quickly aggregate, and a highly-concentrated solution can be obtained from them.

Figure 8:
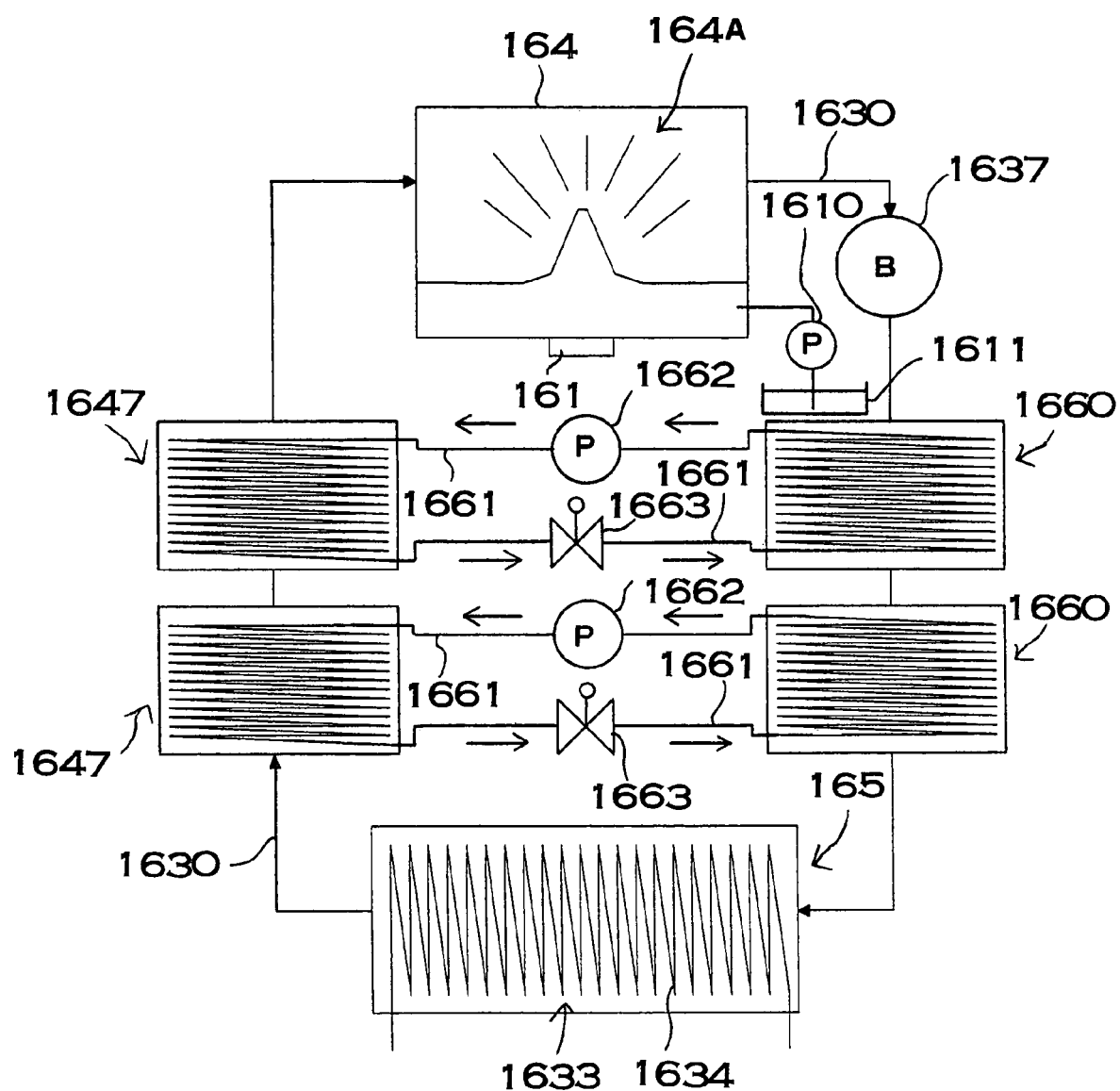
FIG. 8 is a diagram schematically showing an ultrasonic separator according to another embodiment of the present invention.

The ultrasonic separator shown in FIG. 8 includes cooling heat exchangers 1660 of the collection portion 165, which are connected to the outlet side of the ultrasonic atomization chamber 164 and cool the carrier gas, and vapor heaters 1647, which heat the carrier gas supplied to the ultrasonic atomization chamber 164. The vapor heater 1647 includes a heat exchanger, and a circulation path 1661 of a refrigerant connects the heat exchanger of the vapor heater 1647 to the cooling heat exchanger 1660. A compressor 1662, the heat exchanger of the vapor heater 1647, an expansion valve 1663 and the cooling heat exchanger 1660 are connected to the circulation path 1661 of the refrigerant in series. With this apparatus, the vapor heater 1647 is heated by liquifying the gaseous refrigerant, which is pressurized by the compressor 1662 by means of the heat exchanger of the vapor heater 1647, while the cooling heat exchanger 1660 is cooled by vaporizing the refrigerant, which passes through the expansion valve 1663 and is transported to the cooling heat exchanger 1660. The cooling heat exchanger 1660 cools the carrier gas to be transported to the collection portion 165 from the ultrasonic atomization chamber 164, while the vapor heater 1647 heats the carrier gas to be transported to the ultrasonic atomization chamber 164 from the collection portion 165. This construction including the cooling heat exchanger 1660 and the vapor heater 1647 provided on the circulation duct 1630 has an advantage in that it can hold the temperature of the ultrasonic atomization chamber 164 and the collection portion 165 at a predetermined temperature. The carrier gas, which is circulated between the ultrasonic atomization chamber 164 and the collection portion 165, is heated by the vapor heater 1647, and is cooled by the cooling heat exchanger 1660 so that the temperature of the carrier gas in the ultrasonic atomization chamber 164 is at least 5° C. higher than that in the collection portion 165. This construction including the cooling heat exchangers 1660 and the vapor heaters 1647 provided on one circuit can ideally heat and cool the carrier gas while reducing running costs. With the ultrasonic separator shown in the figure, the compressor 1662 and the expansion valve 1663 are connected to each other with the circulation path 1661 of the refrigerant in series. With the ultrasonic separator, however, the refrigerant may be circulated around the circulation path without the compressor and the expansion valve connected to the circulation path. Water can be used as refrigerant and circulated around the circulation path, thus the carrier gas is heated by the vapor heater, and is cooled by the cooling heat exchanger, in this ultrasonic separator.

With the ultrasonic separator shown in FIG. 8, a plurality of the cooling heat exchangers 1660 are connected in series, and a plurality of the vapor heaters 1647 are connected by the circulation path 1661 in series so that a refrigerant is circulated around the plurality of cooling heat exchangers 1660 and the plurality of vapor heaters 1647. In this case, the carrier gas can be ideally heated and cooled, while each cooling heat exchanger 1660 and the heat exchanger of each vapor heater 1647 can be smaller. However, one cooling heat exchanger and one vapor heater may be provided in the ultrasonic separator, and the cooling heat exchangers and the heat exchangers of the vapor heater may be connected by the circulation path.

In the ultrasonic separator of the present invention, a solution or powder may be injected into the carrier gas on the path upstream from the collection portion or a circulation duct whereby the mist and vapor included in the carrier gas are collected. The collected solution can be used as the solution injected into the carrier gas. Moreover, particles capable of aggregating the mist can be used as the powder injected into the carrier gas.

Figure 9:
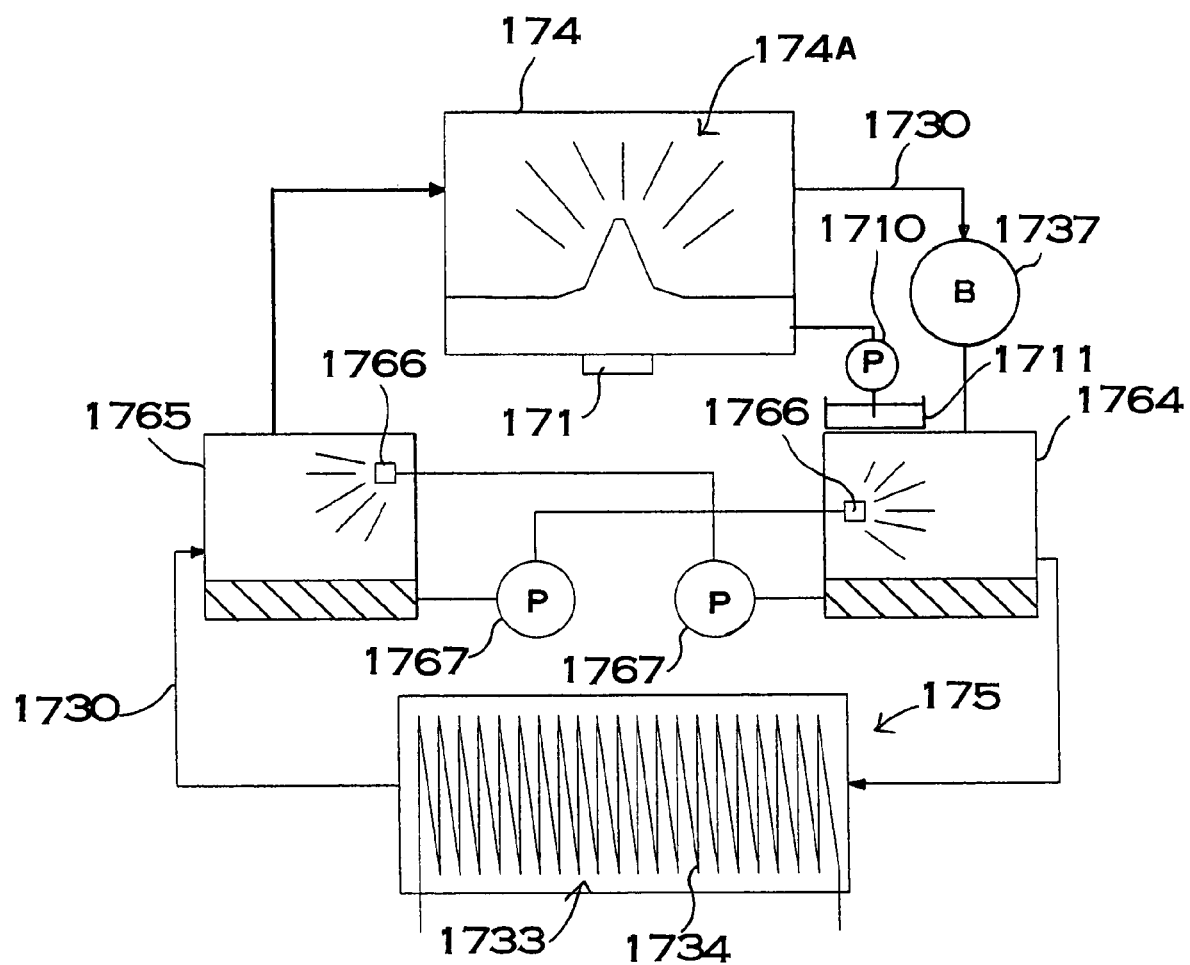
FIG. 9 is a diagram schematically showing an ultrasonic separator according to another embodiment of the present invention.

With the ultrasonic separator shown in FIG. 9, a first spray vessel 1764 for spraying a solution into the carrier gas is connected to the outlet side where the carrier gas is ejected from an ultrasonic atomization chamber 174, while a second spray vessel 1765 for spraying a solution into the carrier gas is connected to the inlet side where the carrier gas is injected into the ultrasonic atomization chamber 174. In the ultrasonic solution separator, a solution stored in the first spray vessel 1764 is sprayed into the second spray vessel 1765, while a solution stored in the second spray vessel 1765 is sprayed into the second spray vessel 1764. The first spray vessel 1764 and the second spray vessel 1765 include the nozzles 1766, which spray the solution. The nozzle 1766 of the first spray vessel 1764 is connected to the bottom part of the second spray vessel 1765 via a circulation pump 1767. The nozzle 1766 of the second spray vessel 1765 is connected to the bottom part of the first spray vessel 1764 via another circulation pump 1767. These circulation pumps 1767 suck in the solution collected by respective spray vessels, and the solution is sprayed from the nozzles 1766. The solution stored in the second spray vessel 1765 is cooled by the carrier gas cooled in the collection portion 175. Thus, the carrier gas passing through the first spray vessel 1764 can be effectively cooled by spraying this solution into the first spray vessel 1764. On the other hand, the solution stored in the first spray vessel 1764 is heated by the carrier gas ejected from the ultrasonic atomization chamber 174, the temperature of which is at least 5° C. higher than the collection portion 175. Thus, the carrier gas passing through the second spray vessel 1765 can be effectively heated by spraying this solution into the second spray vessel 1765. Therefore, this device also has an advantage that has a very simple configuration and can heat the carrier gas supplied to the ultrasonic atomization chamber 174 and cool the carrier gas supplied to the collection portion 175.

Figure 10:
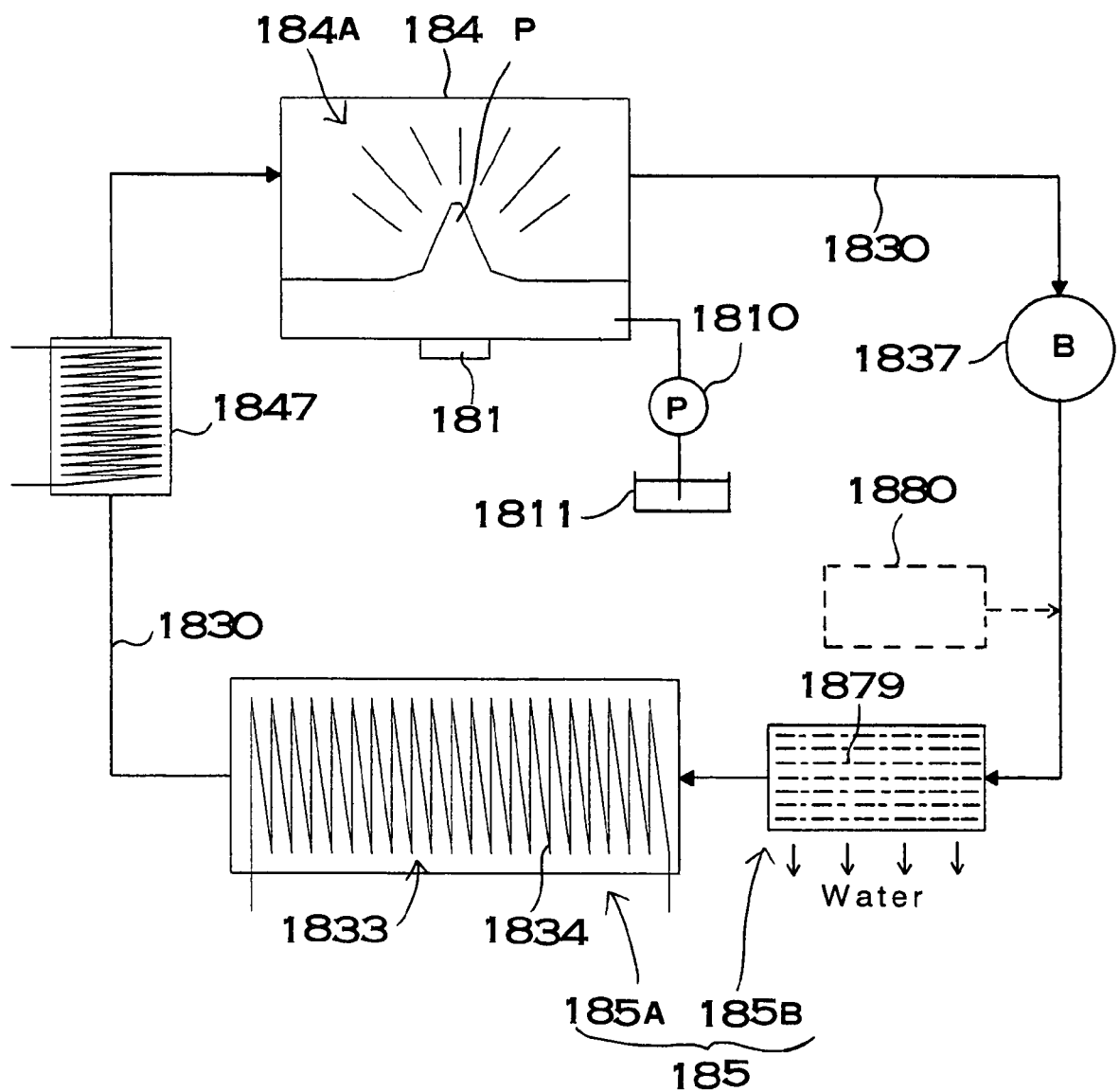
FIG. 10 is a diagram schematically showing an ultrasonic separator according to another embodiment of the present invention.
Figure 11:
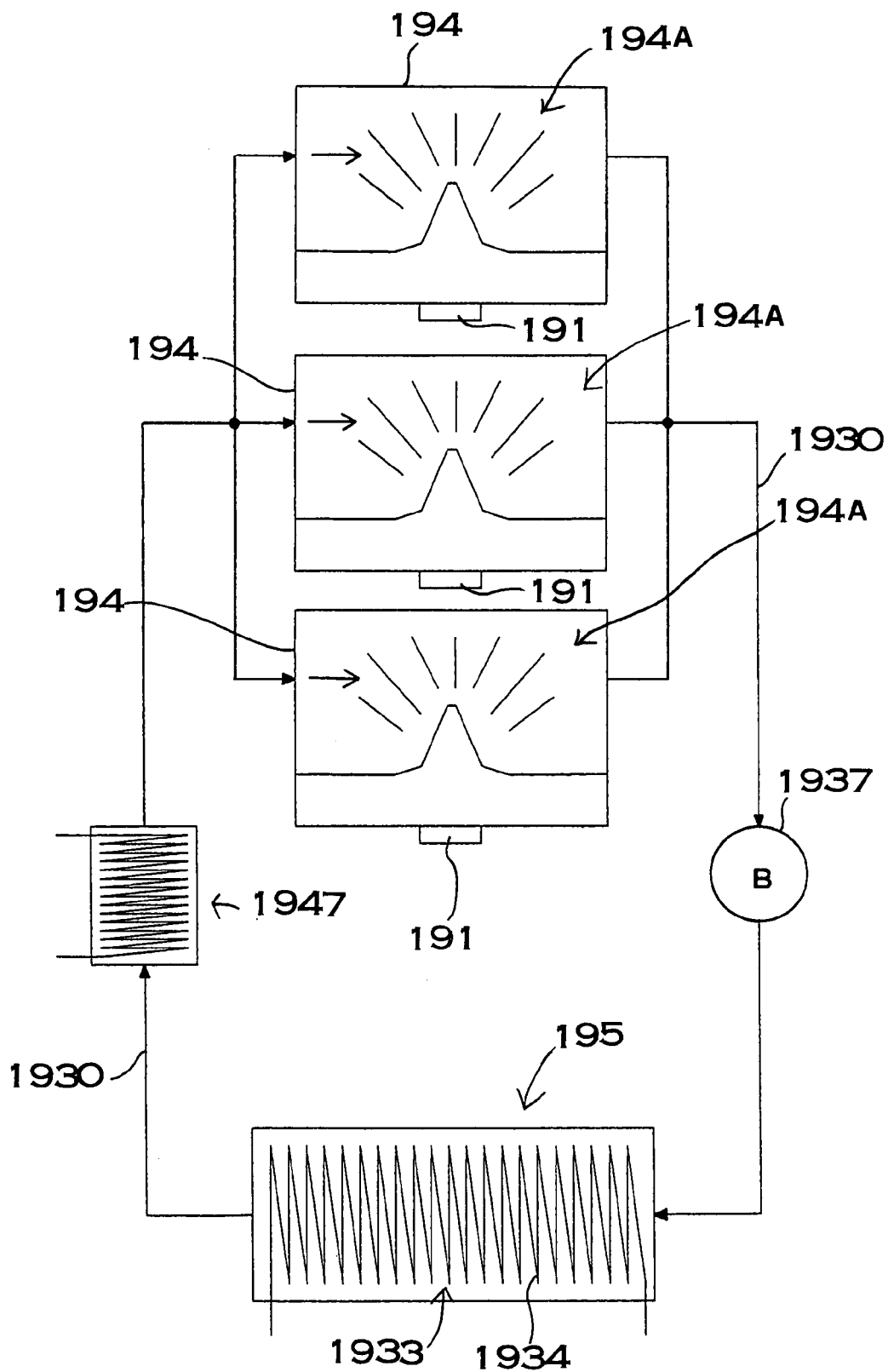
FIG. 11 is a diagram schematically showing an ultrasonic separator according to another embodiment of the present invention.
Figure 12:
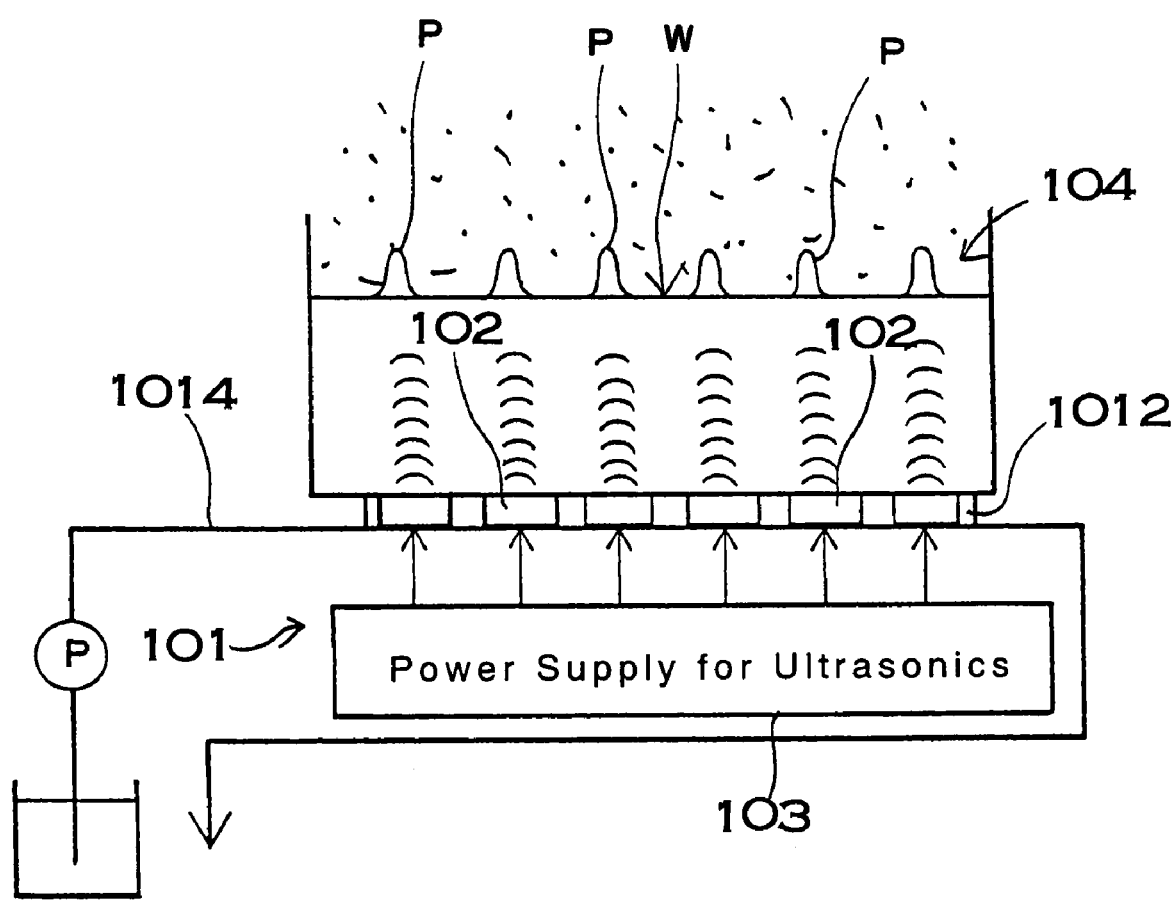
FIG. 12 is a cross-sectional view of one example of an ultrasonic atomization chamber and an ultrasonic atomization device other than water. The following solutions including target materials can be used, for example.

The ultrasonic separator shown in FIG. 10 comprises a collection portion 185 including a permeable membrane 1879, which selectively passes and removes water molecules included in the mist and vapor produced by an ultrasonic atomization chamber 184. This permeable membrane 1879 has a pore size, of the nano-orders, smaller than an alcohol molecule but larger than a water molecule. A hydrophilic permeable membrane made of zeolite can be used as the permeable membrane 1879, for example. The permeable membrane may be made of cellulose or carbon. This collection portion 185 removes water molecules included in the mist and vapor supplied thereto by selectively passing the water molecules without passing alcohol molecules by means of the permeable membrane 1879, and thus separates the alcohol molecules. Accordingly, the concentrations of alcohol of the mist and vapor passing through the collection portion 185 can be high. With the collection portion 185 shown in the figure, a primary collection portion 1858 is connected upstream to a main collection portion 185A. The permeable membrane 1879 is provided in the primary collection portion 185B. In this collection portion 185, the primary collection portion 185B removes the water molecules from the mist and vapor, and the main collection portion 185A collects the mist and vapor with high concentration of alcohol, in which the water molecules are removed. In this case, this collection portion has an advantage in that it can effectively collect a highly-concentrated alcohol solution. With the ultrasonic separator, however, the permeable membrane is not limited to being provided in the primary collection portion. The ultrasonic separator may have a single collection portion, which is provided with the permeable membrane and collects the mist and vapor with high concentration of alcohol.

Furthermore, with this ultrasonic separator, in the case that the mist and vapor produced in the ultrasonic atomization chamber 184 is heated and supplied to the permeable membrane 1879, the water molecule can be more effectively separated by passing the water molecule therethrough. This type of collection portion can be obtained by providing a heater 1880 on the inlet side of the collection portion 185 as shown by a dashed line of the figure, for example. With the ultrasonic separator, however, since means for heating such as a vapor heater 1847 can set the temperature of the mist and vapor produced in the ultrasonic atomization chamber 184 high, it is not always necessary to provide heater 1880. Moreover, the ultrasonic separator shown in the figure includes a blower mechanism 1837 for transporting the carrier gas. This blower mechanism 1837 is provided on the inlet side of the primary collection portion 185B provided with the permeable membrane 1879. In this case, the ultrasonic separator has an advantage in that can it effectively pass the mist and vapor, which are transported with the carrier gas through the permeable membrane 1879 of the primary collection portion 185B, and remove the water molecules, which are included in the mist and the vapor. However, though not illustrated, the blower mechanism may be provided between the primary collection portion including the permeable membrane and the main collection portion.

In the ultrasonic separator of the above embodiment, an alcohol is the target material and water is used as the solvent of the solution. Accordingly, the permeable membrane 1879 has a pore size smaller than an alcohol molecule but larger than a water molecule. However, with the ultrasonic separator of the present invention, the solvent and the target material are not limited to water and an alcohol. With the ultrasonic separator of the present invention, the collection portion is provided with the permeable membrane with a pore size that is larger than a molecule of a solvent of the solution but smaller than a molecule of the target material. The permeable membrane selectively passes molecules of the solvent, which is included in the mist and vapor produced in the ultrasonic atomization chamber. Thus, the target material can be separated.

The blower mechanism 1037 circulates the carrier gas between the ultrasonic atomization chamber 104 and the collection portion 105. With the ultrasonic separator shown in each of FIGS. 2 to 11, the blower mechanism 1037 is provided on the outlet side of the ultrasonic atomization chamber 104. The blower mechanism 1037 provided on the outlet side of the ultrasonic atomization chamber 104 brings the ultrasonic atomization chamber 104 to an internal pressure that is lower than the atmospheric pressure, in other words, brings the interior space portion 104A of the ultrasonic atomization chamber 104 to negative pressure relative to the atmospheric pressure, and circulates the carrier gas. In this case, the mist produced in the ultrasonic atomization chamber 104 can be quickly ejected from the ultrasonic atomization chamber 104. Accordingly, reduction of atomization performance due to interference among the fine droplets of the mist produced from the liquid column generated by the ultrasonic atomization device 101 is prevented. Additionally, the mist produced in the ultrasonic atomization chamber 104 is prevented from returning into the solution surface. Therefore, the produced mist can be transported very efficiently. Furthermore, the ultrasonic separator has an advantage in that it can effectively produce the mist from the solution by decompressing the internal pressure of the ultrasonic atomization chamber 104 to lower than the atmospheric pressure.

The blower mechanism 1037 provided downstream relative to the ultrasonic atomization chamber 104 is provided on the inlet side of the collection portion 105, and thus can bring the collection portion 105 to the internal pressure higher than the atmospheric pressure. With the ultrasonic separator shown in each of FIGS. 2 to 5 and 7 to 11, the blower mechanism 1037 is provided on the outlet side of the ultrasonic atomization chamber 104, and on the inlet side of the collection portion 105. Therefore, the operation of the blower mechanism 1037 can bring the collection portion 105 to internal pressure higher than the atmospheric pressure, while bringing the ultrasonic atomization chamber 104 to internal pressure lower than the atmospheric pressure. The ultrasonic separator, in which internal pressure of the collection portion 105 is higher than the atmospheric pressure, has an advantage in that it can quickly aggregate the mist in the pressurized collection portion 105. In the ultrasonic separator, however, the blower mechanism 1437 may be provided between the main collection portion 145A and primary collection portion 145B consisting of the collection portion 145, as shown in FIG. 6. In this case, the main collection portion 145A is pressurized while the ultrasonic atomization chamber 144 is at a negative pressure. Moreover, with the ultrasonic separator, though not illustrated, the ultrasonic atomization chamber may be connected to a decompressor, and the collection portion may be connected to a compressor. In this case, the internal pressure of the ultrasonic atomization chamber is lower than the atmospheric pressure, while the internal pressure of the collection portion is higher than the atmospheric pressure.

The blower mechanism 1037 includes a rotary fan 1068 for transporting the carrier gas and a motor 1070 for rotating the rotary fan 1068 through a rotary shaft 1069 of the rotary fan 1068 connected to the motor 1070, as shown in FIG. 21. The rotary fan 1068 is provided in a casing 1074 connected with the circulation duct 1030. In the blower mechanism 1037, a bearing 1071 of the rotary shaft 1069 connecting the motor 1070 to the rotary fan 1068 is sealed by a plastic seal member 1072. This type of blower mechanism 1037 has an advantage that can effectively prevent leakage of mist and vapor included in the carrier gas, which is transported through the circulation duct 1030, from the casing 1074 to the outside.

With a blower mechanism 2437 shown in FIG. 22, a motor 2470 is connected to a rotary fan 2468 via a magnetic coupling 2473. In the blower mechanism 2437, components of the magnetic coupling 2473 are secured to a rotary shaft of the motor 2470 and a rotary shaft 2469 of the rotary fan 2468, respectively. A pair of components of the magnetic coupling 2473 magnetically connects these rotary shafts. The blower mechanism 2437 has a seal structure that is closed to the outside, and prevents leakage of the mist and vapor included in the carrier gas from the casing 1074 to the outside. Though not illustrated, however, the blower mechanism may include an electromagnetic coupling instead of the magnetic coupling.

Figure 2:
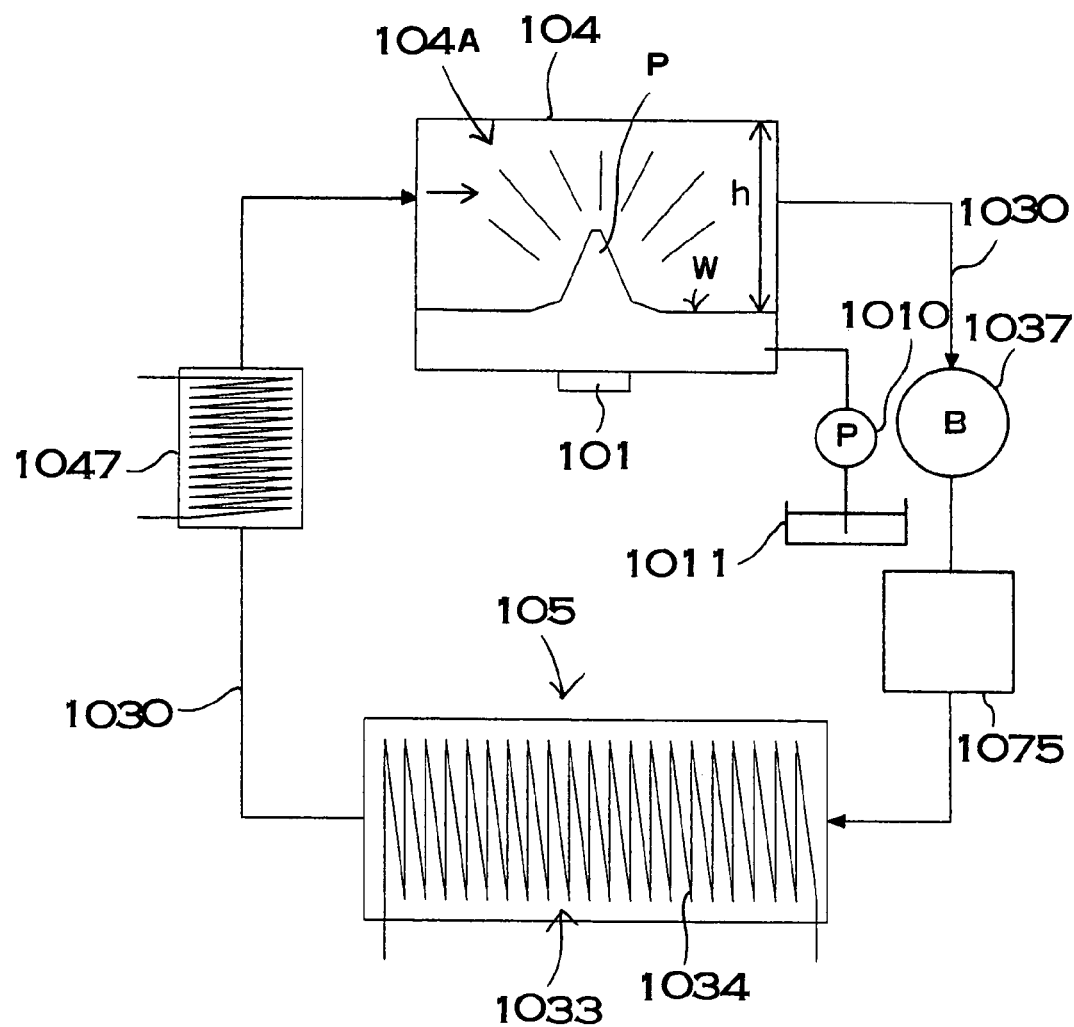
FIG. 2 is a diagram schematically showing an ultrasonic separator according to one embodiment of the present invention.
Figure 3:
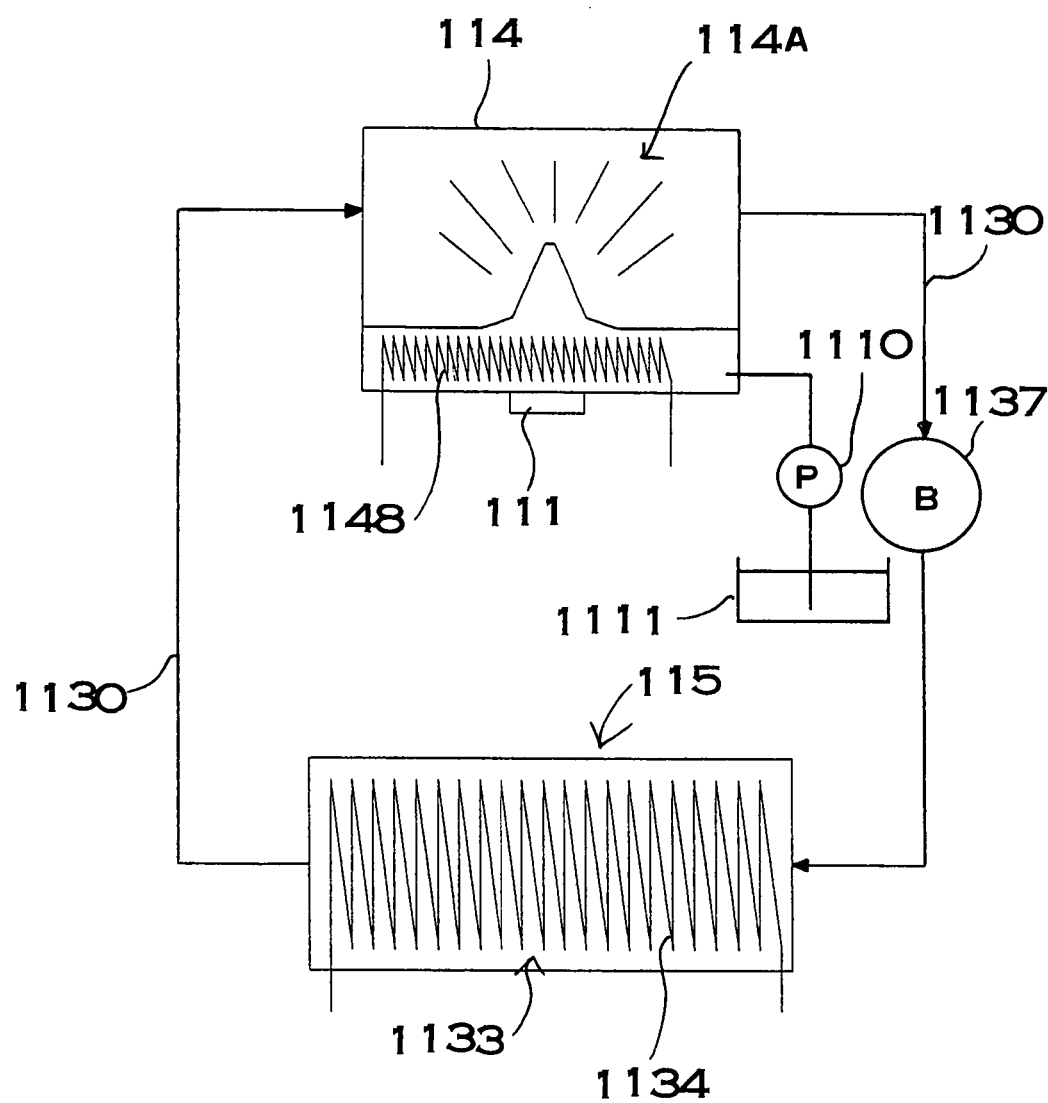
FIG. 3 is a diagram schematically showing an ultrasonic separator according to another embodiment of the present invention.

With the ultrasonic separator shown in FIG. 2, the ultrasonic atomization chamber 104 is connected to the collection portion 105 by the circulation duct 1030. An oxygen reduction device 1075 is provided on the circulation path, through which the carrier gas is circulated around the ultrasonic atomization chamber 104, the collection portion 105 and the circulation duct 1030. The oxygen reduction device 1075 reduces the concentration of oxygen in the carrier gas. This type of ultrasonic separator can reduce the concentration of oxygen included in the carrier gas, which is circulated through the circulation duct 1030 and contains the mist produced in the ultrasonic atomization chamber 104, by means of the oxygen reduction device 1075. Accordingly, the ultrasonic separator has an advantage in that it can prevent oxidation of the target material included in the transported carrier gas during transportation. Therefore, the target material can be collected in high quality without deterioration.

The ultrasonic atomization chamber 104 and the collection portion 105 are preferably filled with inert gases as the carrier gas. In this case, the inert gases prevent deterioration of the solution in the ultrasonic atomization chamber 104 or the collection portion 105. Therefore, a concentrated solution with higher quality can be obtained. However, air or gases with a low solubility to water may be also used as the carrier gas.

On the other hand, an alcohol in the mist vaporizes. Thus, the alcohol supplied to the collection portion includes fine droplets as the mist and the vapor. The alcohol supplied as the mist aggregates and is collected by the collection portion, while the alcohol of vapor is condensed to a liquid by cooling the carrier gas and is collected. Although the alcoholic vapor can be collected by condensing the alcoholic vapor to a liquid, the amount of alcohol collected by condensing the alcoholic vapor to a liquid is limited. The reason is that the cooled carrier gas can contain a little alcohol and water of vapor. FIG. 23 is a graph of a saturation vapor pressure curve showing the amount of water vapor, which can be contained in the air. In other words, the figure is a graph of a relationship between the total amount of water included in the air in the saturation, i.e., 100% humidity, and temperature. As shown in the amount of water included in the air in FIG. 23, the total amount of water and alcohol, which can be included in the air, varies depending on the temperature. The total amount increases as the temperature increases, while the total amount decreases as the temperature decreases.

As seen in this figure, the amount of water, which can be contained in the air used as a carrier gas, decreases as the temperature decreases. Thus, the water and alcohol of gas that become supersaturated condenses to a liquid when the air is cooled. As seen in this graph, even if the temperature of the air becomes 0° C., the air can contain water of vapor, and all the alcohol cannot be collected by condensing the alcohol.

Unfortunately, when the alcohol and water, which vaporize from the mist and are contained in the carrier gas, are collected by condensing them, the water tends to be collected more easily than the alcohol by condensing them. Namely, the alcohol tends to vaporize from the mist more easily than the water, while the water tends to condense to a liquid more easily than the alcohol after they vaporize. For this reason, after the alcohol and water are collected by cooling the carrier gas, the concentration of alcohol included in the carrier gas becomes higher. The reason is that, an alcohol tends to easily vaporize but is less prone to condense to a liquid. For example, as compared with 30 mol of the concentration of alcohol in the mist produced in the ultrasonic atomization chamber, the concentration of alcohol in the mist supplied to the collection portion decreases to 25 mol. On the other hand, as for the concentration of alcohol of vapor contained in the carrier gas, compared with 50 mol in the state that the carrier gas is supplied to the collection portion, the concentration in the state that the carrier gas is ejected from the collection portion extremely increases to 70 mol. This shows that though the mist with high concentration of alcohol is produced, the alcohol cannot be effectively collected. This problem can be solved by more effectively condensing an alcohol and water and collecting the alcohol under the condition where the carrier gas is cooled to a lower temperature. However, when the temperature of the carrier gas is low, energy consumption for cooling increases, and running cost increases. Furthermore, when a low-temperature carrier gas is supplied to the ultrasonic atomization chamber, the efficiency of atomization from the solution extremely decreases. Accordingly, the low-temperature carrier gas should be heated and then supplied to the ultrasonic atomization chamber. In this case, there is a defect that requires a large amount of energy for heating, as the temperature of the carrier gas is lower.

Therefore, it is difficult for an ultrasonic separator to effectively collect mist while producing the mist with a high concentration of alcohol in the ultrasonic atomization chamber. This problem can be solved as follows. A solution containing a target material, which quickly moves to the surface thereof and exhibits the characteristics of surface excess, is oscillated at an ultrasonic frequency in the ultrasonic atomization chamber whereby the mist is produced therein. The produced mist is transported to the collection portion. The target material is collected in the collection portion by aggregating it, and is separated from the solution. After the mist is collected in the collection portion, the target material of vapor is absorbed by an absorbent and is collected in a secondary collection portion.

The ultrasonic separators shown in FIGS. 24 to 27 additionally include secondary collection portions 2536, 2636, 2736, and 2836 connected to the collection portions 255, 266, 275, and 285 in the foregoing apparatuses. Components except the secondary collection portion in the apparatuses shown in these figures can serve to separate the target material similar to those of the foregoing apparatuses without a secondary collection portion. Accordingly, components, which are the same as or similar to those of the foregoing embodiments, are attached with numerals with the same last digit(s) of reference numerals except the first two digits of numerals, and their description is omitted. Furthermore, in embodiments shown in FIGS. 24 to 27, components, which are the same as or similar to those of the other embodiments, are attached with numerals with the same last digit(s) of reference numerals except the first two digits of numerals.

With the secondary collection portion 2536, a vapor, such as an alcohol of the target material, included in the carrier gas, is collected by absorbing the vapor by means of an adsorbent 2538. In the secondary collection portion 2536, the alcohol adsorbed by the adsorbent 2538 is ejected by a heated collection gas, and the ejected alcohol is condensed to a liquid and is collected by cooling the collection gas.

The secondary collection portion 2536 of the figure includes a rotor 2539 to be rotated and a rotary drive mechanism 2540 for rotating this rotor 2539. The rotary drive mechanism 2540 is a reduction motor or servomotor, which rotates the rotor 2539 at a predetermined speed. The rotor 2539 is a honey cam rotor having voids through which the carrier gas can pass in the direction of a rotary shaft. This rotor 2539 includes the adsorbent 2538 in the void. Any of, or a mixture of two or more of zeolite, activated carbon, lithium hydroxide and silica gel can be used as the absorbent 2538. The rotor 2539 rotates movably between an absorption area 2539A where the vapor is adsorbed and a regeneration area 2539B where the adsorbed vapor is ejected. In the rotor 2539 of the figure, the upper portion is drawn as the adsorption area 2539A, and the lower portion is drawn as the regeneration area 2539B.

When the rotor 2539 moves to the absorption area 2539A, the carrier gas containing the vapor of alcohol of the target material passes through the void, and the alcohol of the target material included in the carrier gas is adsorbed into the absorbent 2538. When the rotor 2539 rotates and moves to the regeneration area 2539B, the adsorbed alcohol of the target material is ejected. The ejected alcohol of the target material is collected by cooling the collected vapor. The carrier gas passing through the adsorption area 2539A of the rotor 2539 is transported to the ultrasonic atomization chamber 254 again.

In order to collect the alcohol of the target material, which is adsorbed by the adsorbent 2538 of the rotor 2539, from the adsorbent 2538, a collection path 2541 separating the target material is connected to the regeneration area 2539B of the rotor 2539. A heater 2542, a blower mechanism 2543, and a condensation heat exchanger 2544 are connected to this collection path 2541. The heater 2542 heats the collected vapor to be supplied to the rotor 2539. The blower mechanism 2543 passes the collected vapor heated by the heater 2542 through the path to the regeneration area 2539B of the rotor 2539. The condensation heat exchanger 2544 cools the collected vapor, which contains the alcohol of the target material after passing through the regeneration area 2539B of the rotor 2539, and condenses and collects the alcohol of the target material.

When the collected vapor passes through the regeneration area 2539B of the rotor 2539 after being heated by the heater 2542, the alcohol of the target material adsorbed into the adsorbent 2538 is separated from the adsorbent 2538. The collected vapor, which contains the alcohol of the target material after passing through the regeneration area 2539B, is cooled by the condensation heat exchanger 2544. The amount of target material, which can be contained by the collected and cooled vapor, is getting less. Thus, the alcohol of the target material becomes supersaturated and condenses to a liquid. That is, the condensation heat exchanger 2544 condenses the vapor of the alcohol of the target material included in the collected vapor to a liquid, or freezes it to a solid, and collects the alcohol of the target material.

Figure 25:
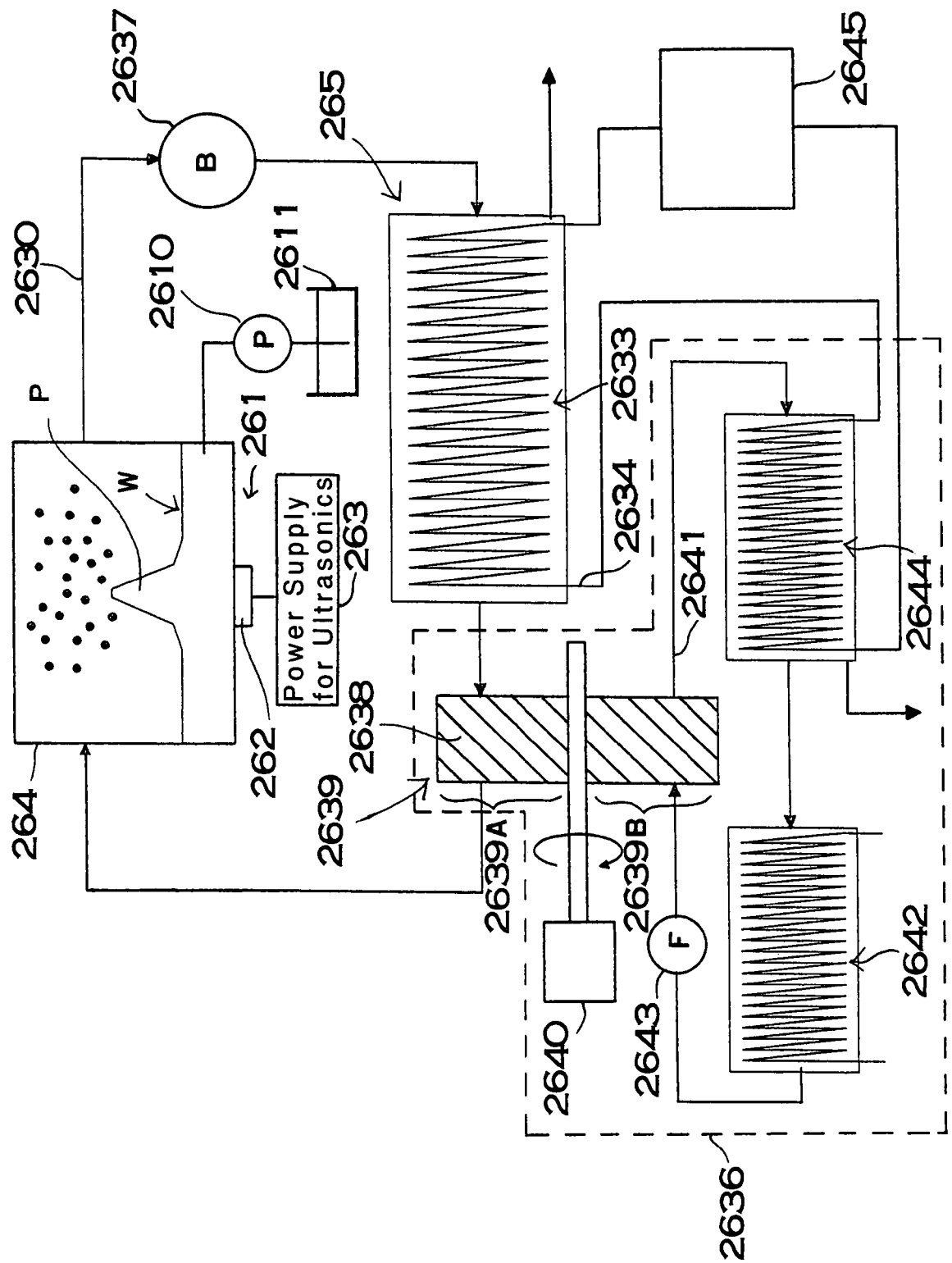

With the ultrasonic separator of FIG. 25, one cooling chiller 2645 cools a condensation heat exchanger 2644, which cools the collected vapor, and a cooling heat exchanger 2633, which is provided in the collection portion 265 and cools the carrier gas. In this case, since one cooling chiller 2645 can cool two heat exchangers, it is possible to simplify the whole structure.

Figure 26:
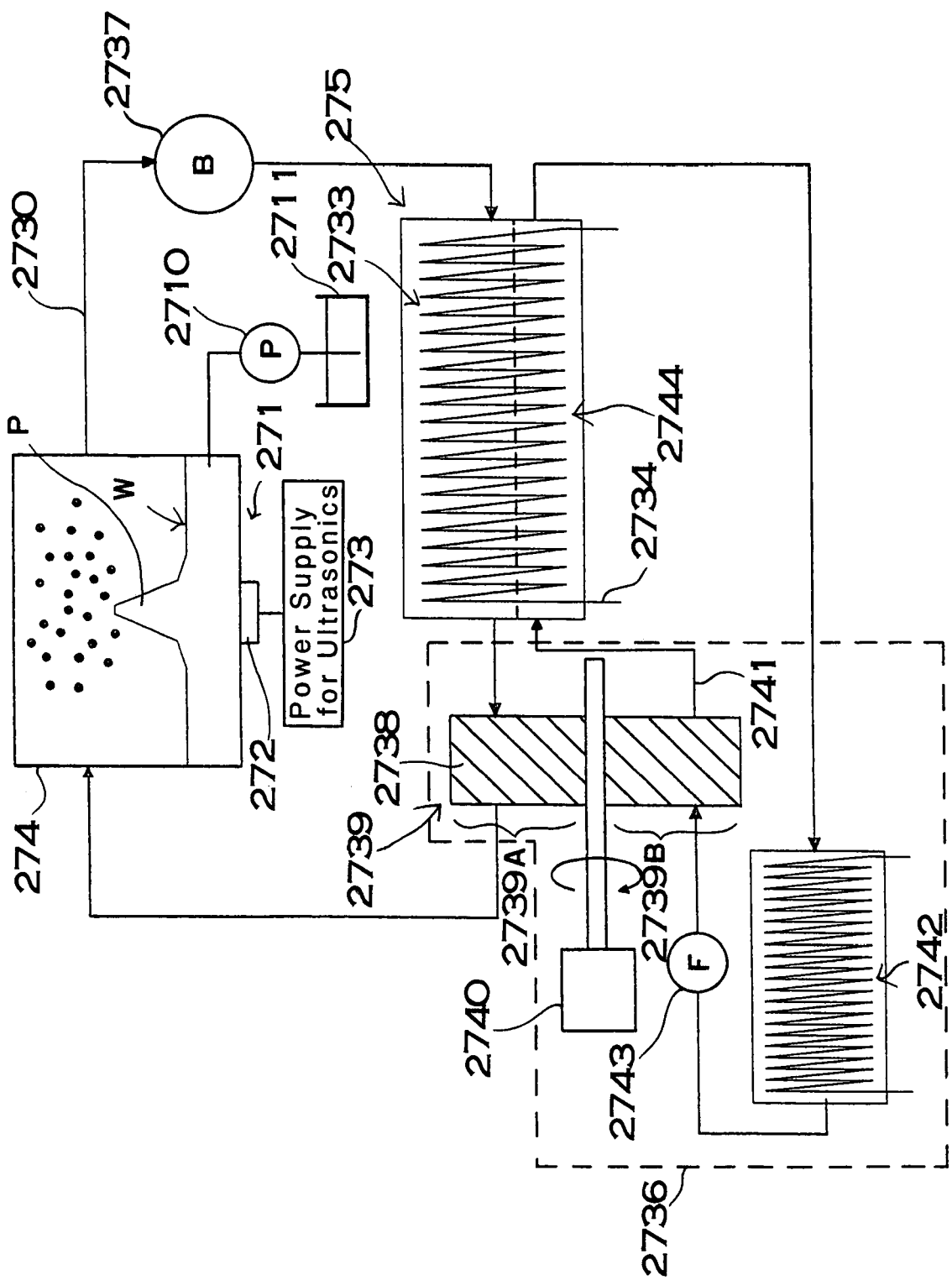
Figure 27:
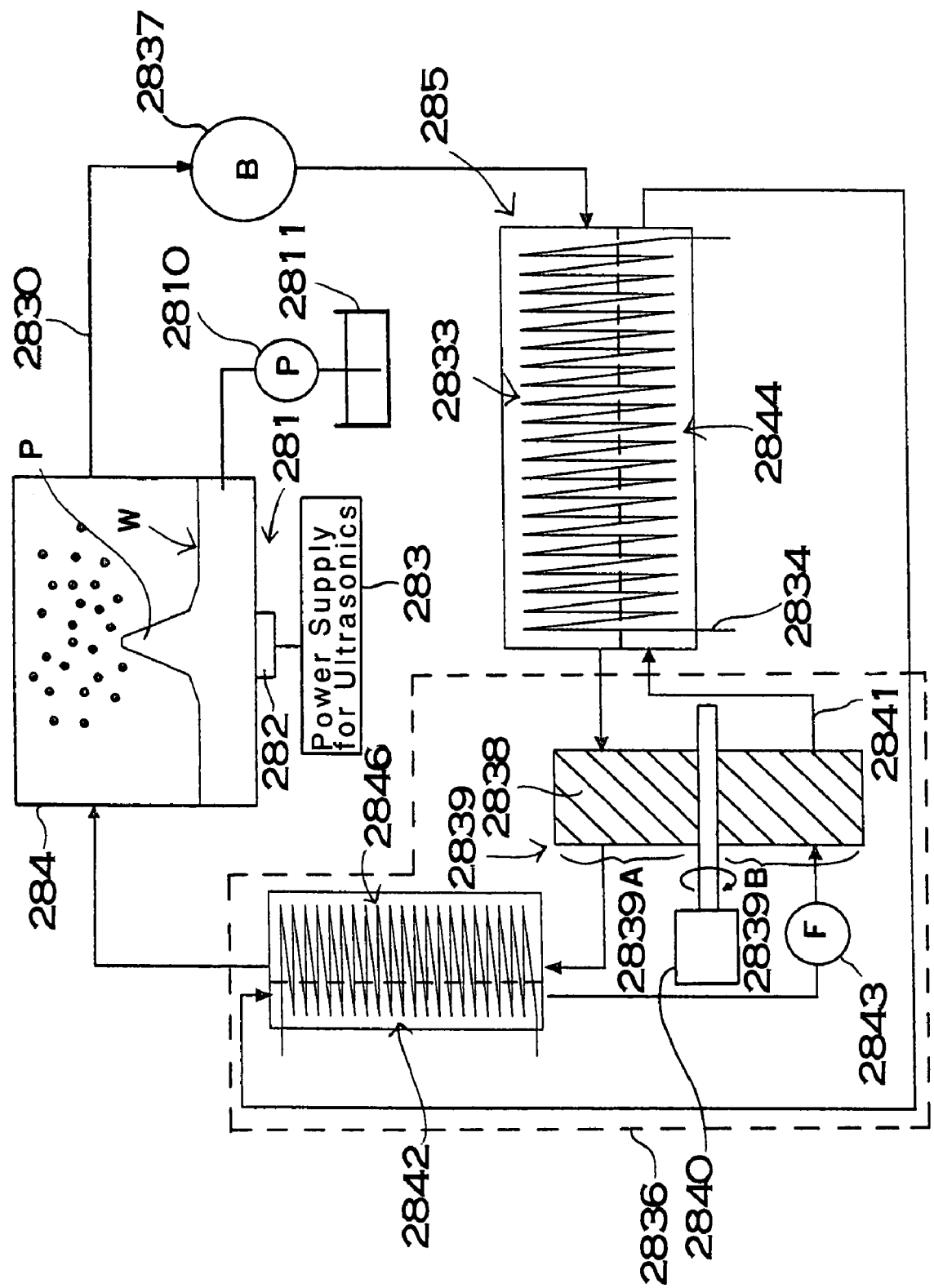

With the ultrasonic separators of FIGS. 26 and 27, heat exchangers 2733 and 2833 unitarily serve as cooling heat exchangers 2733 and 2833, which are provided in the collection portions 275 and 285 and cool the carrier gas, and condensation heat exchangers 2744 and 2844 which cool the collected vapor in the collection paths 2741 and 2841. That is, one heat exchanger cools the carrier gas and the collected vapor. The carrier gas and the collected vapor pass through areas divided from each other so that they are not mixed.

With the ultrasonic separator of FIG. 27, a heating heat exchanger 2846 is provided between the secondary collection portion 2836 and an ultrasonic atomization chamber 284. The heating heat exchanger 2846 heats the carrier gas which is circulated between the secondary collection portion 2836 and the ultrasonic atomization chamber 284. In this ultrasonic separator, since the carrier gas supplied to the ultrasonic atomization chamber 284 can be heated, the mist can be efficiently produced in the ultrasonic atomization chamber 284. The reason is that the amount of mist production increases as the temperature of the carrier gas and the solution is higher. The extent to which the mist produced from the solution in the ultrasonic atomization chamber 284 depends on the temperature of the solution and the carrier gas. The heating heat exchanger 2846 heats the carrier gas to 25 to 30° C. However, the carrier gas may be heated to 15 to 40° C. by the heating heat exchanger 2846, and then supplied to the ultrasonic atomization chamber 284. When the temperature of the carrier gas supplied to the ultrasonic atomization chamber 284 is high, the amount of mist production increases. However, when the temperature is too high, the target material such as an alcohol deteriorates. On the other hand, when the temperature is too low, the efficiency of production of the target material is prone to decrease.

With the ultrasonic separator of FIG. 27, the heating heat exchanger 2846 which heats the carrier gas serves as a heater 2842 which heats the collected vapor so that the collected vapor is heated by the heating heat exchanger 2846 for heating the carrier gas. In this type of apparatus, one heating heat exchanger 2846 can heat both the carrier gas and the collected vapor. In this heating heat exchanger 2846, the carrier gas and the collected vapor are separated and heated whereby they are not mixed.

Figure 28:
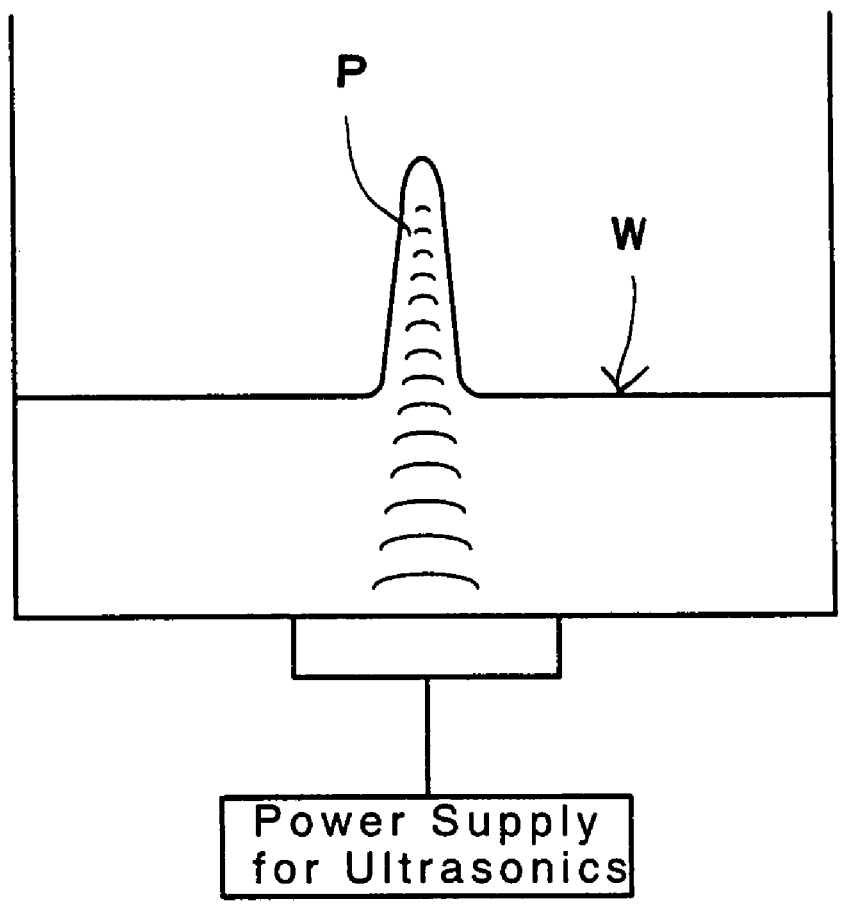

It is important for the ultrasonic separator to efficiently produce the mist by oscillating the solution at an ultrasonic frequency. When the solution is oscillated upward from the bottom at an ultrasonic frequency, a liquid column P is generated from the surface of the solution W as shown in FIG. 28, and the mist is produced therefrom. Upward and downward ultrasonic waves collide inside the liquid column P. This collision of the ultrasonic waves causes reduction of atomization efficiency from the solution. The reason is that the solution can not be oscillated at an ultrasonic frequency due to damping of ultrasonic waves when ultrasonic waves collide inside the liquid column P.

This problem can be solved as follows. A blower mechanism for blowing to a liquid column generated from the surface of the solution by ultrasonic oscillation by means of the ultrasonic oscillator is provided in the ultrasonic oscillator. The blower mechanism blows to the liquid column so that the liquid column bends in the direction that is parallel to the surface of the solution.

Figure 29:
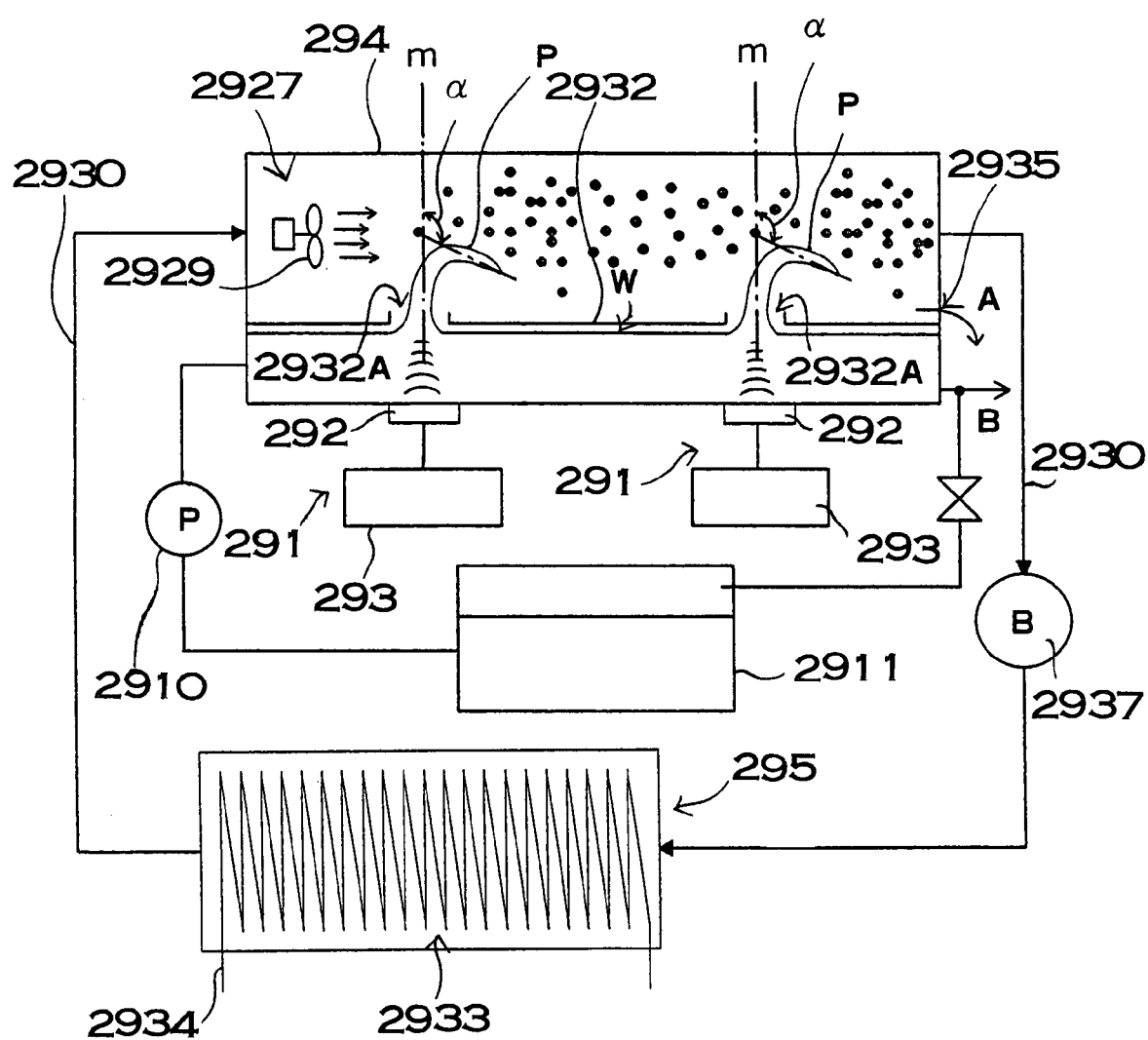
Figure 30:
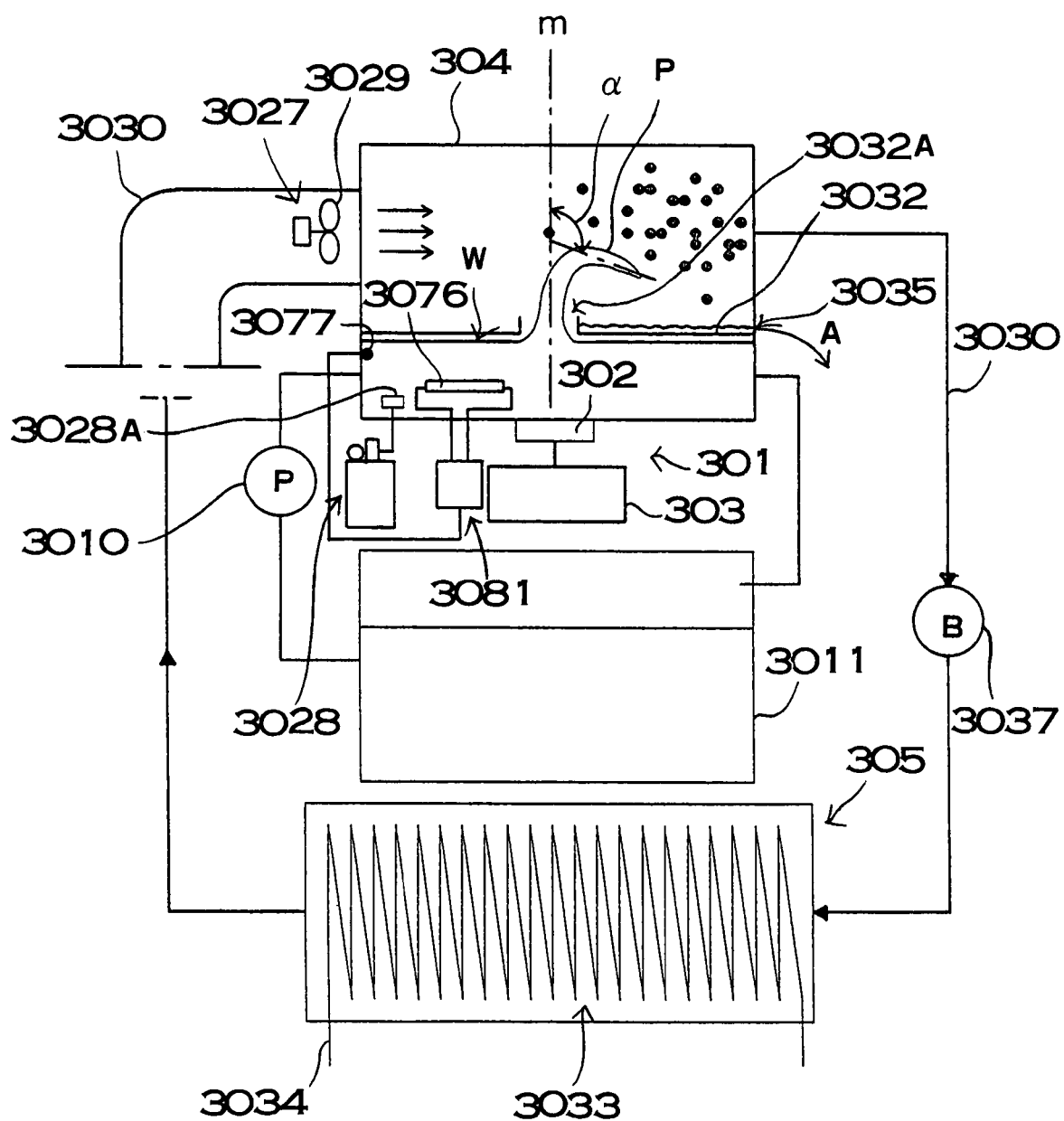

The ultrasonic separators shown in FIGS. 29 and 30 include blower mechanisms 2927 and 3027, which blow to the liquid column P generated from the surface of the solution W by ultrasonic oscillation by means of the ultrasonic oscillator 292 and 302. Components except the blower mechanism in the apparatuses shown in these figures can serve similarly to those of the foregoing apparatuses. Accordingly, components, which are the same as or similar to those of the foregoing embodiments, are attached with numerals with the same last digit(s) of reference numerals except the first two digits of numerals, and their description is omitted. Furthermore, in embodiments shown in FIGS. 29 and 30, components, which are the same as or similar to those of the other embodiments, are attached with numerals with the same last digit(s) of reference numerals except the first two digits of numerals.

The liquid column P generated from the surface of the solution W by ultrasonic oscillation is blown from the blower mechanisms 2927 and 3027. Blowing to the liquid column P by the blower mechanisms 2927 and 3027 bends the liquid column P in the direction that is parallel to the surface of the solution W. As shown in FIGS. 29 and 30, blowing bends the liquid column P so that the end of the liquid column P is bent, or the whole liquid column P is inclined. The shape of the liquid column P bent toward the direction that is parallel to the surface of the solution W by the blower mechanisms 2927 and 3027 depends on the amount and velocity of blowing, and a region of the liquid column blown by the blower mechanisms 2927 and 3027. When the end of the liquid column P is blown, the liquid column P is bent whereby the end is blown off as shown in the figure. Although not illustrated, when the whole liquid column is blown, the liquid column is bent whereby the whole liquid column is inclined relative to the vertical direction. The extent to which the liquid column P is bent is larger, as the velocity of blowing is higher. The blower mechanisms 2927 and 3027 blow the liquid column P so that the angle ($\alpha$) between the end of the liquid column P and the vertical axis that is an axis perpendicular to the surface of the solution W and passes the center of the base of the liquid column P is not less than 15°, preferably not less than 30°.

The blower mechanisms 2927 and 3027 include fans 2929 and 3029 which blow the liquid column P. The blower mechanism is provided inside an ultrasonic atomization chamber 294 as shown in FIG. 29, or inside a circulation duct 3030 connected to an ultrasonic atomization chamber 304 as shown in FIG. 30. The fan 2929 provided in the ultrasonic atomization chamber 294 sucks and blows air in the ultrasonic atomization chamber 294 to the liquid column P. The fan 3029 provided in the circulation duct 3030 accelerates air circulated through the circulation duct 3030 and blows it to the liquid column P.

Figure 31:
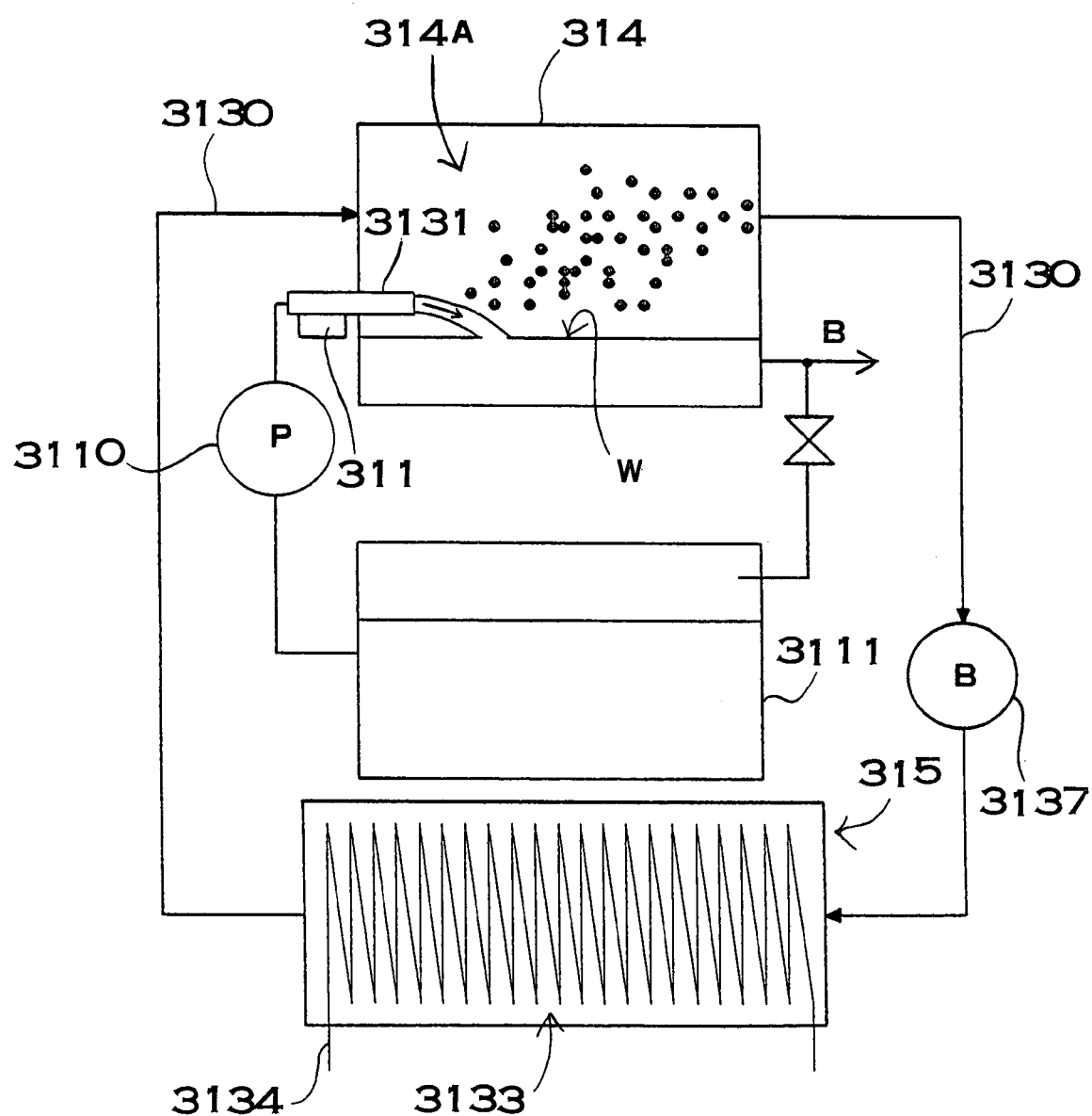
Figure 32:
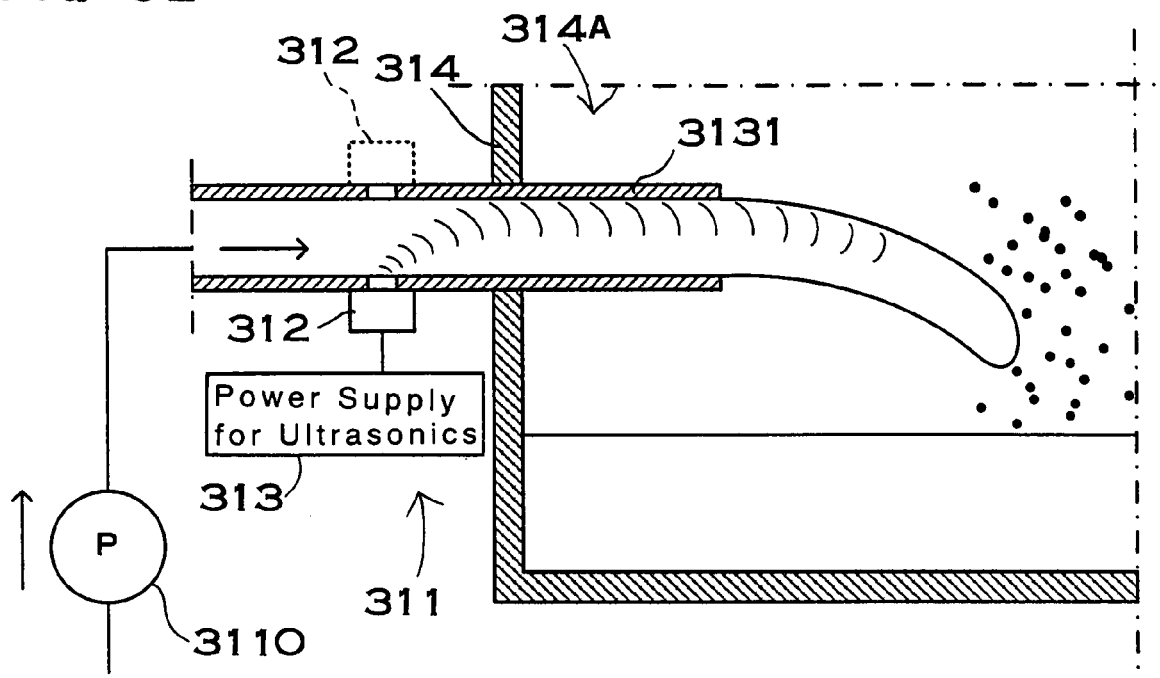

With the ultrasonic separator of FIG. 31, the solution is supplied to an ultrasonic atomization chamber 314 through a solution supply pipe 3131. The solution in the solution supply pipe 3131 is oscillated at an ultrasonic frequency and is ejected to an interior space portion 314A of the ultrasonic atomization chamber 314 whereby mist is produced. With this apparatus, an ultrasonic oscillator 312 is fixed on the path of the solution inlet pipe 3131. The ultrasonic oscillator 312 is fixed on the periphery of the solution supply pipe 3131 and oscillates the solution therein at an ultrasonic frequency toward the transportation direction as shown in FIG. 32, or is fixed at a corner part of the solution supply pipe 3331 so as to oscillate the solution therein at an ultrasonic frequency in the transportation direction. The ultrasonic oscillator 312 fixed to the straight portion of the solution supply pipe 3131 of FIG. 32 emits supersonic waves in an incline direction or the transverse direction. This ultrasonic oscillator 312 may be fixed on the periphery of the solution supply pipe 3131. For example, the ultrasonic oscillator 312 can be also fixed on the upper surface of the solution supply pipe 3131 as shown by a dashed line in the figure.

Figure 33:
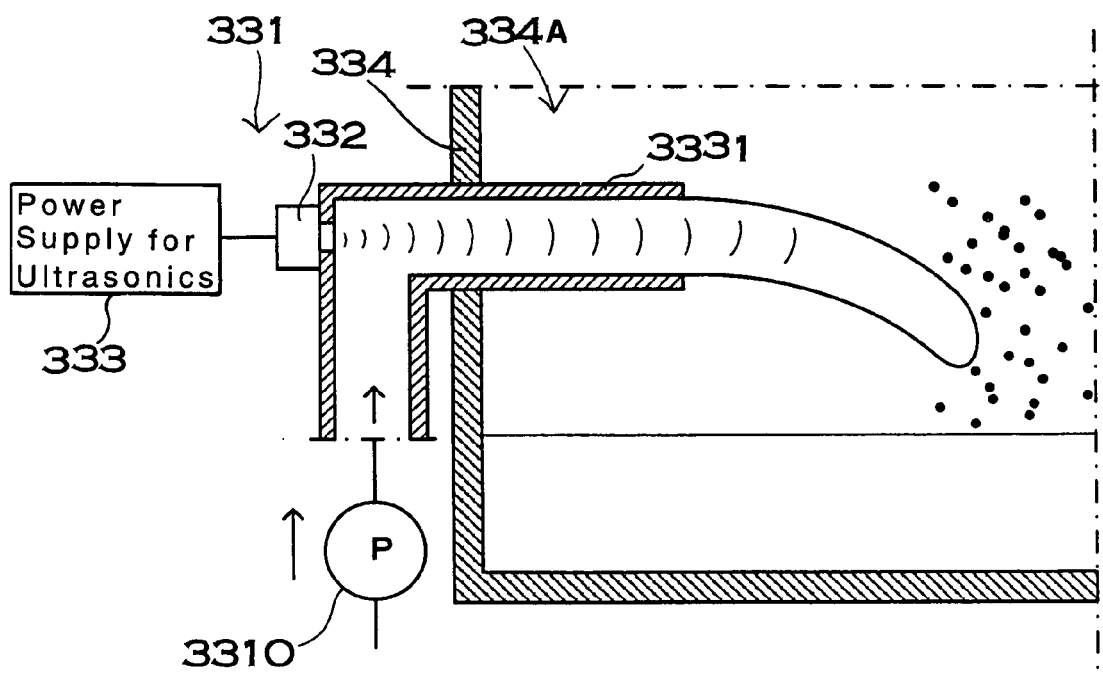
Figure 34:
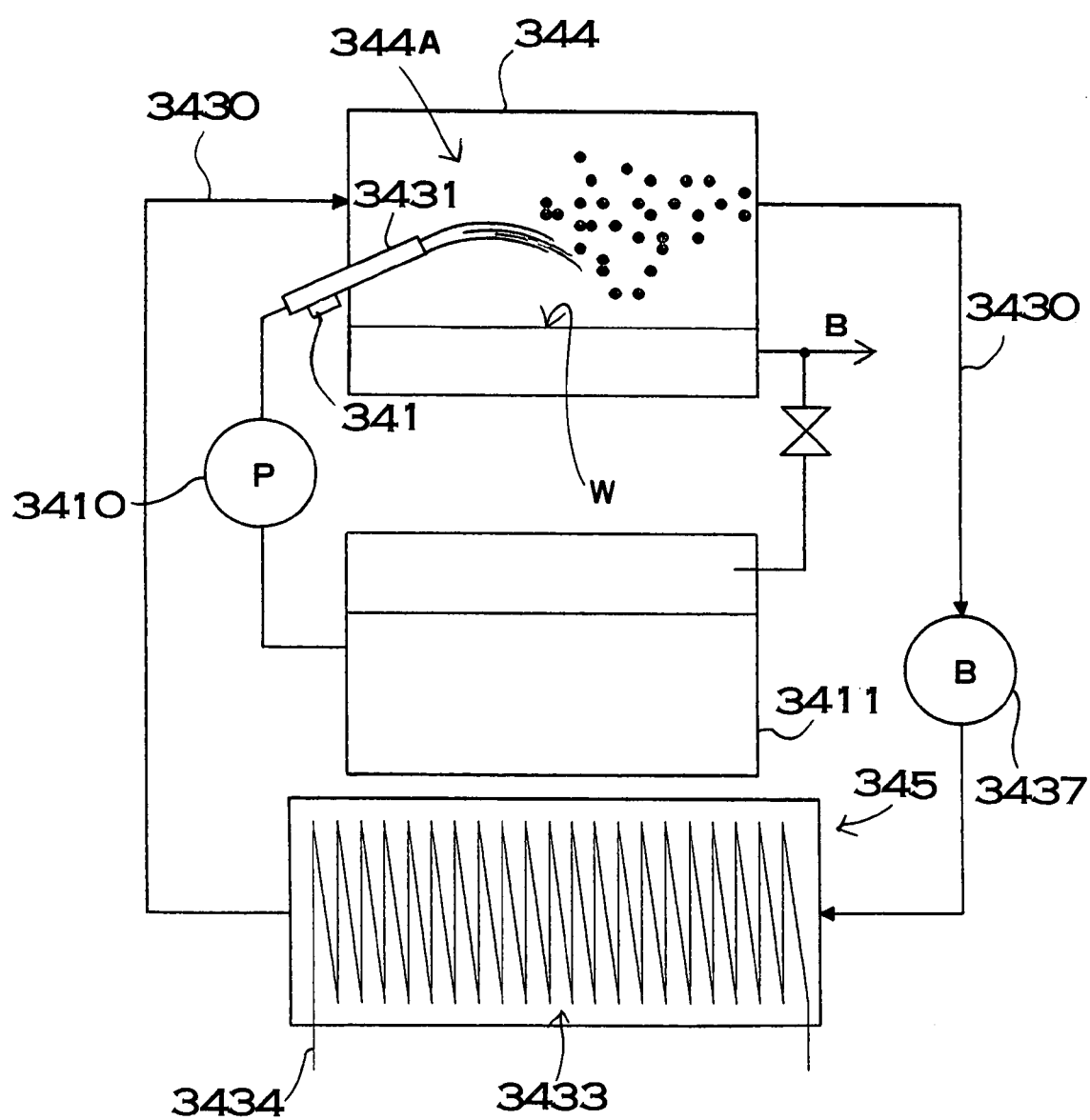

The solution supply pipes 3131 and 3331 are connected to the ultrasonic atomization chamber in the horizontal direction as shown in FIGS. 31 and 33. A solution supply pipe 3431 is connected to the ultrasonic atomization chamber so as to be upwardly inclined. Although not illustrated, a solution supply pipe may be connected to the ultrasonic atomization chamber so as to be downwardly inclined. The solution ejected from the solution supply pipe 3431 inclined upwardly falls downward from its end through the top while bending. The solution ejected from the solution supply pipe 3431 with this posture falls while bending sharply. The solution ejected from the solution supply pipes 3131 and 3331 with the horizontal posture bend so that their fore ends downwardly fall. The solution supply pipes 3131, 3331, and 3431 are connected to the ultrasonic atomization chambers 314, 334, and 344 in the posture where they intersect the vertical direction. Thus, the solution elected therefrom falls while bending due to its weight.

With the ultrasonic separators shown in FIGS. 31 to 34, the solution is stored in the bottom part of the ultrasonic atomization chamber 314, 334, or 344. The solution supply pipe 3131, 3331, or 3431 supplies the solution to the interior space portion 314A, 334A, or 344A above the surface of the stored solution W. However, the ultrasonic separator may eject the solution, which is supplied to the interior space portion of the ultrasonic atomization chamber from the solution supply pipe, without storing it in the bottom part from the ultrasonic atomization chamber.

Figure 35:
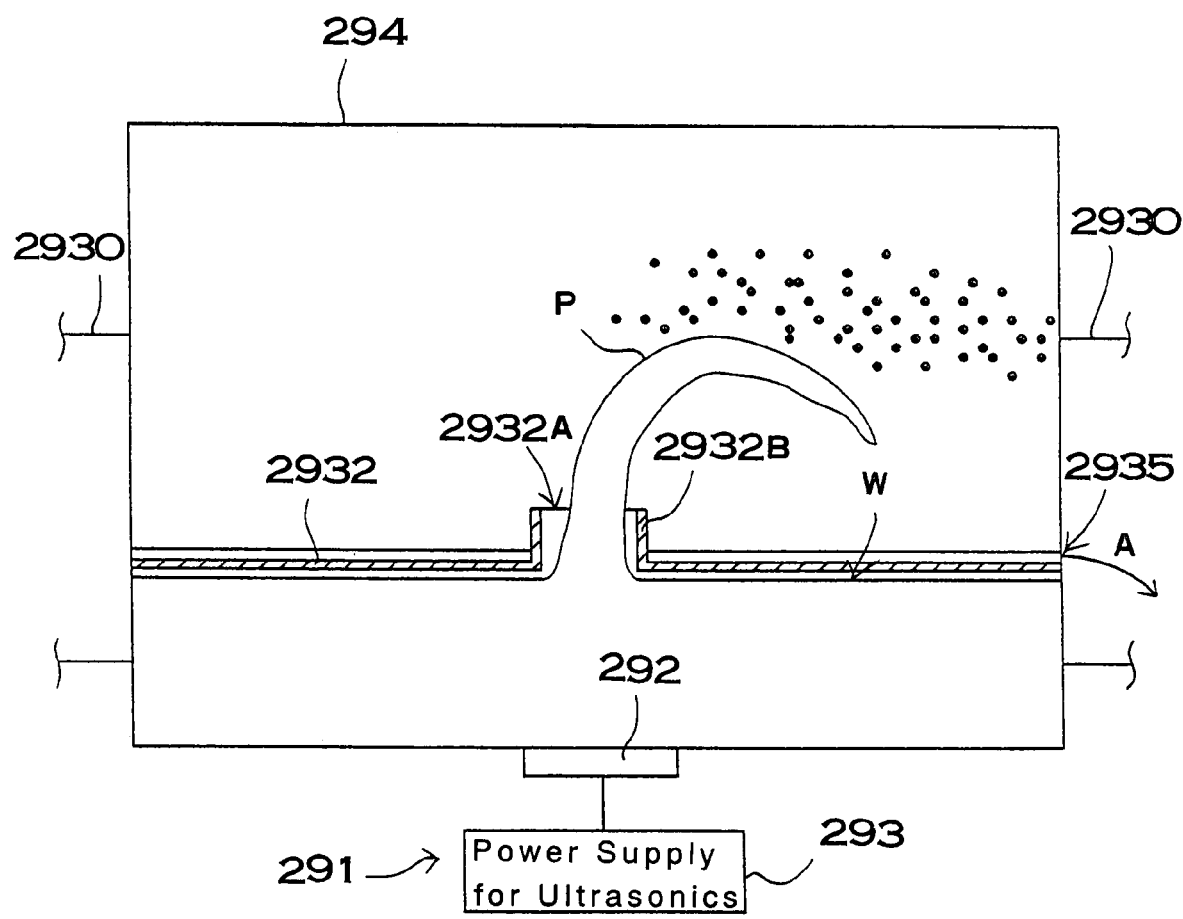

With the ultrasonic separator shown in FIG. 29 and FIG. 30, shields 2932 and 3032 cover the surface of the solution W, as shown in an enlarged view of FIG. 35. The shields 2932 and 3032 are provided with through holes 2932A and 3032, which open so that the liquid column P protrudes therefrom. These shields 2932 and 3032 shield the surface of the solution W from the gas the ultrasonic atomization chambers 294 and 304 so as to prevent vaporization of the solution into the gas. In this case, the solution, which vaporizes, can be less prone to aggregate and be collected with the mist. If the solution vaporizes in the ultrasonic atomization chamber 294 or 304, the concentration of the target material in the gas that vaporizes from the solution that becomes lower than the mist produced from the solution. The reason is that the mist of the solution is produced into the gas under surface excess conditions, thus, the concentration of the target material therein is higher than the gas that vaporizes.

The shields 2932 and 3032 are sheets or plates of a plastic, which float on the solution, or metal plates or the like, which are horizontally fixed to the ultrasonic atomization chambers 294 and 304 and through which the solution does not pass. With the shields 2932 and 3032, a separation wall 2932B is disposed around the through hole 2932A or 3032A and separates the solution falling onto the shield 2932 or 3032 from the solution under the shield 2932 or 3032. That is, the separation wall prevents the solution under the shield 2932 or 3032 from being mixed with the solution falling onto the shield 2932 or 3032. With the ultrasonic atomization chambers 294 and 304, an outlet 2935 or 3055 is arranged to eject the solution supplied onto the upper surface of the shield 2932 or 3032 whereby separating the solution supplied onto the upper surface of the shield 2932 or 3032 from the solution under the shield 2932 or 3032. The solution falling onto the shield 2932 or 3032 is ejected from the ultrasonic atomization chamber 294 or 304 thereby separating it from the solution under the shield 2932 or 3032, as shown by an arrow A in FIG. 29, 30 or 35. The solution falling onto the shield 2932 or 3032 is the rest of the solution, a part of which is produced as the mist containing a highly-concentrated target material from. Accordingly, the concentration of the target material in this solution is lower than the solution under the shield 2932 or 3032. If the solution on the shield 2932 or 3032 is mixed with the solution under the shield 2932 or 3032, the concentration of the target material in the solution under the shield 2932 or 3032 decreases. On the other hand, in the case that the solution on the shield 2932 or 3032 is ejected without mixing it with the solution under the shield 2932 or 3032, the solution, which the mist is separated from, does not reduce the concentration of the target material in the solution under the shield 2932 or 3032. Thus, the concentration of the target material in the mist produced therefrom can be constantly high.

With the ultrasonic separator of FIG. 31, the solution ejected from the solution supply pipe 3131 is stored in the bottom part of the ultrasonic atomization chamber 314, and this solution is circulated into an undiluted solution tank 3111. The solution in the undiluted solution tank 3111 is sucked by a pump 3110, and is supplied to the solution supply pipe 3131. The solution in the ultrasonic atomization chamber 314 supplied from the solution supply pipe 3131 overflows therefrom, and circulates into the undiluted solution tank 3111. With this apparatus, the concentration of the target material included in the solution reduces as the target material is separated. Accordingly, when the concentration of the target material in the solution becomes low, the whole solution is renewed. The solution of the ultrasonic atomization chamber 314 can be ejected to the outside without circulating it into the undiluted solution tank 3111, as shown by an arrow B in FIG. 31, thereby preventing reduction of the concentration of the target material included in the undiluted solution tank 3111.

Furthermore, the ultrasonic solution separator of FIG. 30 further comprises a bubble generator 3028 providing bubbles to the solution of the ultrasonic atomization chamber 304. The bubble generator 3028 is provided with a bubble generation portion 3028A in the solution of the ultrasonic atomization chamber 304. This bubble generation portion 3028A provides bubbles into the solution. Accordingly, the ultrasonic separator providing bubbles into the solution of the ultrasonic atomization chamber 304 increases gas solubility in the solution, and enhances cavitation produced in the solution. Thus, the ultrasonic separator has an advantage that can efficiently produce the mist from the solution by means of ultrasonic waves.

Furthermore, the ultrasonic separator shown in FIG. 30 includes a temperature control mechanism 3081 for controlling the temperature of the solution in the ultrasonic atomization chamber 304. The temperature control mechanism 3081 includes a cooler 3076 for cooling the solution so that the temperature of the solution is lower than a predetermined temperature. This temperature control mechanism 3081 detects the temperature of the solution stored in the ultrasonic atomization chamber 304 by means of a temperature sensor 3077, and controls the cooler 3076 whereby keeping the temperature of the solution in the ultrasonic atomization chamber 304 not higher than 30° C. Thus, the ultrasonic separator, which controls the temperature of the solution by means of the temperature control mechanism 3081 can increase the solubility of bubbles of gas supplied from the bubble generator 3028.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or the equivalence of such metes and bounds thereof are therefore intended to be embraced by the claims.

This application is based on applications No. 2003-280499 filed in Japan on Jul. 25, 2003, No. 2003-302161 filed in Japan on Aug. 26, 2003, No. 2003-303705 filed in Japan on Aug. 27, 2003, and No. 2003-303706 filed in Japan on Aug. 27, 2003, the contents of which are incorporated hereinto by reference.

What is claimed is:

1. An ultrasonic solution separator for separating a target material from a solution containing the target material, the ultrasonic solution separator comprising:
   An ultrasonic atomization chamber for receiving the solution containing the target material;
   An ultrasonic oscillator for producing mist from the solution in the ultrasonic atomization chamber with ultrasonic oscillation;
   A power supply for ultrasonic connected to the ultrasonic oscillator, the power supply being operable to supply high-frequency power to the ultrasonic oscillator so that the ultrasonic oscillator oscillates at an ultrasonic frequency;
   A carrier gas contained in the ultrasonic solution separator;
   A collection portion for transporting the mist produced by the ultrasonic oscillator with the carrier gas and aggregating and collecting the mist included in the carrier gas; and
   A vapor heater for heating the carrier gas, the vapor heater being located at the inlet side of the ultrasonic atomization chamber so that heated carrier gas is circulated into the ultrasonic atomization chamber,
   Wherein the mist produced in the ultrasonic atomization chamber is aggregated and collected by means of the collection portion,
   Wherein the temperature of carrier gas in the ultrasonic atomization chamber is at least 5° C. higher than the carrier gas in the collection portion.

2. The ultrasonic solution separator according to claim 1, further comprising a solution heater for heating the solution in the ultrasonic atomization chamber, wherein an ultrasonic atomization device produces mist from the solution in the state that the solution heater heats the solution.

3. The ultrasonic solution separator according to claim 1, wherein the collection portion includes a scrubber or a spray tower, and the scrubber or the spray tower includes a storage portion for storing the collected solution and contacting the collected solution with the mist in the carrier gas and collecting the mist in the carrier gas.

4. The ultrasonic solution separator according to claim 1, wherein the collection portion includes a scrubber or a spray tower, and the scrubber or the spray tower includes a storage portion for storing the collected solution, wherein the mist in the carrier gas is collected by any one of, or a combination of two or more of cyclone, punched plate provided with a number of small holes, wire mesh demister, chevron, filter, capillary and honeycomb after contacting the collected solution with the mist in the carrier gas.

5. The ultrasonic solution separator according to claim 1, further comprising a blower mechanism for circulating the carrier gas between the ultrasonic atomization chamber and the collection portion, the blower mechanism including a rotary fan for transporting the carrier gas and a motor for rotating the rotary fan through a rotary shaft of the rotary fan connected to the motor, wherein the motor and the rotary fan are connected by a bearing of the rotary shaft, which is sealed by a plastic seal member, a magnetic coupling or an electromagnetic coupling.

6. The ultrasonic solution separator according to claim 1, further comprising a blower mechanism for circulating the carrier gas between the ultrasonic atomization chamber and the collection portion, wherein the height of an interior space portion of the ultrasonic atomization chamber from the surface of the solution is not higher than 50 cm, and the blower mechanism is operable to transport the carrier gas in the interior space portion of the ultrasonic atomization chamber at a velocity of not less than 0.01 m/s.

7. The ultrasonic solution separator according to claim 1, further comprising a blower mechanism for circulating the carrier gas between the ultrasonic atomization chamber and the collection portion, wherein the blower mechanism is operable to transport the carrier gas so as to keep the ratio F/V (1/min.) of the volume V (liter) of the interior space portion to the flow rate of the carrier gas F (liter/min) of the ultrasonic atomization chamber not less than 1.

8. The ultrasonic solution separator according to claim 1, wherein a plurality of ultrasonic atomization chambers are stacked and are connected in parallel or in series.

9. The ultrasonic solution separator according to claim 1, wherein the collection portion includes a conductive metal plate, a cooler for cooling the metal plate, a counter electrode opposed to the metal plate, and a high voltage power supply, which has one terminal connected to the metal plate and another terminal connected the counter electrode for generating an electric field between the metal plate and the counter electrode.

10. The ultrasonic solution separator according to claim 1, wherein the collection portion includes a main collection portion and a primary collection portion connected upstream relative to the main collection portion, and the primary collection portion includes any one of, or two or more of cyclone, punched plate provided with numbers of small holes, wire mesh demister, chevron, filter, capillary, honeycomb or a device for collecting the mist by means of electrostatic attraction forces.

11. The ultrasonic solution separator according to claim 10, further comprising a blower mechanism for circulating the carrier gas between the ultrasonic atomization chamber and the collection portion, wherein the blower mechanism is provided between the main collection portion and the primary collection portion, or between the ultrasonic atomization chamber and the primary collection portion.

12. The ultrasonic solution separator according to claim 1, wherein the carrier gas is an inert gas or a low water soluble gas.

13. The ultrasonic solution separator according to claim 1, further comprising a cooling heat exchanger for cooling the carrier gas transported to the collection portion, the cooling heat exchanger being connected to the outlet side of the ultrasonic atomization chamber, wherein the vapor heater includes a heat exchanger, and a circulation path of a refrigerant connects the heat exchanger of the vapor heater to the cooling heat exchanger.

14. The ultrasonic solution separator according to claim 13, wherein the circulation path of the refrigerant connects a compressor to an expansion valve in series, and the heat exchanger of the vapor heater liquefies the gas refrigerant, which is compressed by the compressor thereby heating the vapor heater, while the cooling heat exchanger vaporizes the liquefied refrigerant thereby cooling itself.

15. The ultrasonic solution separator according to claim 13, wherein a plurality of cooling heat exchangers are connected in series, and a plurality of vapor heaters are connected in series so that the refrigerant is circulated around the plurality of cooling heat exchangers and the plurality of vapor heaters.

16. The ultrasonic solution separator according to claim 1, wherein the internal pressure of the ultrasonic atomization chamber is higher than the atmospheric pressure, while the internal pressure of the collection portion is lower than the atmospheric pressure.

17. The ultrasonic solution separator according to claim 16, further comprising a blower mechanism for circulating the carrier gas between the ultrasonic atomization chamber and the collection portion, wherein the blower mechanism is provided on the outlet side of the ultrasonic atomization chamber and the inlet side of the collection portion.

18. The ultrasonic solution separator according to claim 1, wherein a solution or a powder is injected into the carrier gas on the path upstream from the collection portion or a circulation duct.

19. The ultrasonic solution separator according to claim 18, wherein the collected solution, or particles capable of aggregating the mist are injected into the carrier gas.

20. The ultrasonic solution separator according to claim 1, wherein a first spray vessel for spraying a solution into the carrier gas is connected to the outlet side where the carrier gas is ejected from the ultrasonic atomization chamber, while a second spray vessel for spraying a solution into the carrier gas is connected to the inlet side where the carrier gas is injected into the ultrasonic atomization chamber, and a solution stored in the first spay vessel is sprayed into the second spray vessel, while a solution stored in the second spay vessel is sprayed into the first spray vessel.

21. The ultrasonic solution separator according to claim 1, wherein the collection portion includes a permeable membrane having a pore size that is larger than a particle of a solvent of the solution and is smaller than a particle of the target material, wherein the target material is separated by selectively passing the particle of the solvent contained in the mist or vapor, which is produced in the ultrasonic atomization chamber, by means of the permeable membrane.

22. The ultrasonic separator according to claim 21, wherein the permeable membrane is made of material including any of zeolite, cellulose, carbon, silica and ceramic.

23. The ultrasonic solution separator according to claim 1, the ultrasonic solution separator further comprising a secondary collection portion for collecting vapor of the target material ejected from the collection portion by absorbing the vapor of the target material by means of an absorbent, the secondary collection portion being connected to the collection portion, wherein the collection portion aggregates and collects the mist produced in the ultrasonic atomization chamber, and the secondary collection portion collects the vapor of the target material by absorbing the vapor of the target material by means of the absorbent.

24. The ultrasonic solution separator according to claim 23, wherein the collection portion aggregates and collects the mist, which is produced in the ultrasonic atomization chamber and is transported with the carrier gas to the collection portion, and the secondary collection portion collects the vapor of the target material included in the carrier gas, which is collected by the collection portion.

25. The ultrasonic solution separator according to claim 24, wherein the collection portion includes a cooling heat exchanger for cooling the carrier gas, and the target material included in the carrier gas is separated from the carrier gas by cooling the carrier gas by means of the cooling heat exchanger.

26. The ultrasonic separator according to claim 24, wherein the secondary collection portion includes a rotary rotor having a void, through which the carrier can pass in its rotation axis direction and which is provided with the absorbent, and the rotor rotates movably between an absorption area and a regeneration area, wherein the carrier gas including the vapor of the target material passes through the void, and the target material included in the carrier is absorbed into the absorbent, when the rotor moves to absorption area, while the absorbed target material is ejected, and the ejected target material is collected, when the rotor moves to the regeneration area.

27. The ultrasonic separator according to claim 26, wherein a collection path separating the target material, which is absorbed to the absorbent, is connected to the regeneration area of the rotor, the collection path being connected to a heater for heating the collected gas, and a blower mechanism passes the collected gas, which is heated by the heater, through a path of the regeneration area of the rotor, and a condensation heat exchanger collecting the target material by cooling the collected gas, which passes through the void of the regeneration area of the rotor and includes the target material, wherein the collected gas, which is heated by the heater, passes through the regeneration area, and the collected gas, which passes through the regeneration area, is cooled by the condensation heat exchanger, and thereby the target material included in the gas is aggregated and collected.

28. The ultrasonic separator according to claim 23, wherein the absorbent is any of, or a mixture of two or more of zeolite, activated carbon, lithium hydroxide and silica gel.

29. The ultrasonic solution separator according to claim 1, wherein the ultrasonic oscillator is watertightly fixed to a detachable plate, and the detachable plate is watertightly and detachably attached to a casing of the ultrasonic atomization chamber, wherein the detachable plate is attached to the casing of the ultrasonic atomization chamber so that the ultrasonic oscillator can oscillate the solution in the ultrasonic atomization chamber at an ultrasonic frequency.

30. The ultrasonic solution separator according to claim 29, wherein the detachable plate includes a front side plate and a backside plate, which are laminated and watertightly sandwich the ultrasonic oscillator between them so that an oscillation surface is positioned in a through hole, which is provided in the front side plate.

31. The ultrasonic solution separator according to claim 30, wherein the backside plate is provided with a recessed portion, in which the ultrasonic oscillator is fitted, on its surface opposed to the front side plate.

32. The ultrasonic solution separator according to claim 1, further comprising a blower mechanism, which blows to a liquid column generated on the surface of the solution by ultrasonic oscillation of the ultrasonic oscillator so that the liquid column bends in a direction that is parallel to the surface of the solution.

33. The ultrasonic solution separator according to claim 32, further comprising a bubble generator providing bubbles to the solution of the ultrasonic atomization chamber.

34. The ultrasonic solution separator according to claim 33, further comprising a temperature control mechanism for keeping the temperature of the solution of the ultrasonic atomization chamber not higher than 30° C.

35. The ultrasonic solution separator according to claim 32, wherein a shield shielding the surface of the solution from a gas in the ultrasonic atomization chamber thereby preventing vaporization of the solution into the gas is provided on the surface of the solution, the shield being provided with a through hole, from which the liquid column protrudes, wherein an outlet is arranged to eject the solution provided on the upper surface of the shield thereby separating the solution provided on the upper surface of the shield from the solution of the ultrasonic atomization chamber.

36. An ultrasonic solution separator for separating a target material from a solution, the ultrasonic solution separator comprising:
 an ultrasonic atomization chamber for receiving the solution containing the target material;
 an ultrasonic oscillator for producing mist from the solution in the ultrasonic atomization chamber with ultrasonic oscillation;
 a power supply for ultrasonics connected to the ultrasonic oscillator, the power supply being operable to supply high-frequency power to the ultrasonic oscillator so that the ultrasonic oscillator oscillates at an ultrasonic frequency;
 a collection portion for transporting the mist produced by the ultrasonic oscillator with a carrier gas and aggregating and collecting the mist included in the carrier gas;
 a vapor heater for heating the carrier gas, the vapor heater being located at the inlet side of the ultrasonic atomization chamber so that heated carrier gas can be circulated into the ultrasonic atomization chamber; and
 a blower mechanism for blowing a flow of gas to a liquid column generated on a surface of the solution by ultrasonic oscillation of the ultrasonic oscillator,
 wherein the collection portion is operable to aggregate and collect the mist produced in the ultrasonic atomization chamber,
 wherein the temperature of carrier gas in the ultrasonic atomization chamber is at least 5° C. higher than the carrier gas in the collection portion.

37. An ultrasonic solution separator for separating a target material from a solution containing the target material, the ultrasonic solution separator comprising:
 an ultrasonic atomization chamber for receiving the solution containing the target material;
 a solution supply pipe connected to the ultrasonic atomization chamber for supplying the solution into an interior space portion of the ultrasonic atomization chamber;
 an ultrasonic oscillator for producing mist from the solution in the solution supply pipe by ultrasonic oscillation, wherein the solution supply pipe ejects the solution while the ultrasonic oscillator oscillates the solution at an ultrasonic frequency inside the solution supply pipe thereby producing the mist in the solution supply pipe;
 a power supply for ultrasonics connected to the ultrasonic oscillator, the power supply being operable to supply high-frequency power to the ultrasonic oscillator so that the ultrasonic oscillator oscillates at an ultrasonic frequency;
 a collection portion for transporting the mist produced by the ultrasonic oscillator with a carrier gas and aggregating and collecting the mist included in the carrier gas; and
 a vapor heater for heating the carrier gas, the vapor heater being located at the inlet side of the ultrasonic atomization chamber so that heated carrier gas is circulated into the ultrasonic atomization chamber,
 wherein the mist produced in the ultrasonic atomization chamber is aggregated and collected by means of the collection portion, and
 wherein the temperature of carrier gas in the ultrasonic atomization chamber is at least 5° C. higher than the carrier gas in the collection portion.

* * * * *